United States Patent
Liao et al.

(10) Patent No.: US 11,481,709 B1
(45) Date of Patent: Oct. 25, 2022

(54) CALIBRATING USER CONFIDENCE IN COMPLIANCE WITH AN ORGANIZATION'S SECURITY POLICIES

(71) Applicant: Netskope, Inc., Santa Clara, CA (US)

(72) Inventors: Yihua Liao, Fremont, CA (US); Yi Zhang, Santa Clara, CA (US); Dipak Patil, Fremont, CA (US); Prathamesh Deshpande, Folsom, CA (US); Yongxin Wang, San Ramon, CA (US); Siying Yang, Cupertino, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/326,243

(22) Filed: May 20, 2021

(51) Int. Cl.
*G06Q 10/06* (2012.01)

(52) U.S. Cl.
CPC ..... *G06Q 10/0635* (2013.01); *G06Q 10/0637* (2013.01)

(58) Field of Classification Search
CPC ........................................ G06Q 10/06
See application file for complete search history.

(56) References Cited

U.S. PATENT DOCUMENTS

| | | | |
|---|---|---|---|
| 6,574,655 B1 | 6/2003 | Libert et al. | |
| 7,743,003 B1 | 6/2010 | Tong et al. | |
| 7,996,373 B1 | 8/2011 | Zoppas et al. | |
| 8,127,365 B1 | 2/2012 | Liu et al. | |
| 8,130,747 B2 | 3/2012 | Li et al. | |
| 8,438,630 B1 | 5/2013 | Clifford | |
| 8,776,249 B1 | 7/2014 | Margolin | |
| 9,069,992 B1 | 6/2015 | Vaikar et al. | |

(Continued)

FOREIGN PATENT DOCUMENTS

| | | | |
|---|---|---|---|
| JP | 2012084141 A | 4/2012 | |
| JP | 2015130112 A | 7/2015 | |

(Continued)

OTHER PUBLICATIONS

U.S. Appl. No. 17/326,240—Notice of Allowance dated Dec. 6, 2021, 21 pgs.

(Continued)

*Primary Examiner* — Kurtis Gills
(74) *Attorney, Agent, or Firm* — Haynes Beffel & Wolfeld, LLP; Ernest J. Beffel, Jr.

(57) ABSTRACT

The disclosed technology teaches a method of calibrating a user confidence or risk score that expresses evaluation of user behavior that was not compliant with an organization's security policies, including configuring components of the user confidence or risk score, comprising configuring categorical alert weights, categorized by severity, responsive to administrator controls, for alerts to be generated due to an activity by the user that the organization's security policies treat as risky, and configuring a decay factor that attenuates the alert weights as time passes, responsive to an administrator sensitivity control. The disclosed method includes causing display of resulting user behavior evaluation examples, based on activity examples for user examples, comprising causing display of a time series of the user confidence or risk scores for the activity examples for the user examples, and a resulting user confidence or risk score for the user examples.

20 Claims, 17 Drawing Sheets

(56) References Cited

U.S. PATENT DOCUMENTS

| | | |
|---|---|---|
| 9,185,095 B1 | 11/2015 | Moritz et al. |
| 9,270,765 B2 | 2/2016 | Narayanaswamy et al. |
| 9,275,345 B1 | 3/2016 | Song et al. |
| 9,338,187 B1 | 5/2016 | Oprea et al. |
| 9,398,102 B2 | 7/2016 | Narayanaswamy et al. |
| 9,544,321 B2 | 1/2017 | Baikalov et al. |
| 9,928,377 B2 | 3/2018 | Narayanaswamy et al. |
| 10,162,767 B2 | 12/2018 | Spurlock et al. |
| 10,291,657 B2 | 5/2019 | Narayanaswamy et al. |
| 10,349,304 B2 | 7/2019 | Kim et al. |
| 10,594,730 B1 | 3/2020 | Summers et al. |
| 10,992,699 B1* | 4/2021 | Sites .................. G06N 20/20 |
| 11,019,101 B2 | 5/2021 | Narayanaswamy et al. |
| 11,310,282 B1 | 4/2022 | Zhang et al. |
| 2005/0289354 A1 | 12/2005 | Borthakur et al. |
| 2007/0245420 A1 | 10/2007 | Yong et al. |
| 2008/0127303 A1 | 5/2008 | Wrighton et al. |
| 2008/0216174 A1 | 9/2008 | Vogel et al. |
| 2010/0146269 A1 | 6/2010 | Baskaran |
| 2011/0047590 A1 | 2/2011 | Carr et al. |
| 2011/0131408 A1 | 6/2011 | Cook et al. |
| 2011/0276828 A1 | 11/2011 | Tamaki et al. |
| 2012/0137367 A1 | 5/2012 | Dupont et al. |
| 2013/0254885 A1 | 9/2013 | Devost |
| 2014/0007222 A1 | 1/2014 | Qureshi et al. |
| 2014/0026182 A1 | 1/2014 | Pearl et al. |
| 2015/0067845 A1 | 3/2015 | Chari et al. |
| 2015/0271207 A1 | 9/2015 | Jaiswal et al. |
| 2016/0261621 A1 | 9/2016 | Srivastava et al. |
| 2016/0269467 A1 | 9/2016 | Lee et al. |
| 2016/0275577 A1 | 9/2016 | Sesha et al. |
| 2016/0277374 A1 | 9/2016 | Reid et al. |
| 2016/0285918 A1 | 9/2016 | Peretz et al. |
| 2016/0292445 A1 | 10/2016 | Lindemann |
| 2017/0063720 A1 | 3/2017 | Foskett et al. |
| 2017/0063905 A1 | 3/2017 | Muddu et al. |
| 2017/0091482 A1 | 3/2017 | Sarin et al. |
| 2017/0264640 A1 | 9/2017 | Narayanaswamy et al. |
| 2018/0063182 A1 | 3/2018 | Jones et al. |
| 2018/0219888 A1* | 8/2018 | Apostolopoulos .......................... H04L 63/1425 |
| 2018/0324204 A1 | 11/2018 | McClory et al. |
| 2018/0375892 A1* | 12/2018 | Ganor .................. G06F 3/04847 |
| 2020/0128047 A1 | 4/2020 | Biswas et al. |
| 2020/0358804 A1* | 11/2020 | Crabtree ............... H04L 63/102 |
| 2020/0372040 A1 | 11/2020 | Boehmann et al. |
| 2020/0404007 A1* | 12/2020 | Singh .................... G06F 21/552 |
| 2021/0029137 A1* | 1/2021 | Wright ................ H04L 63/1408 |
| 2021/0081542 A1* | 3/2021 | Brannon ............. G06F 21/6263 |
| 2021/0142209 A1* | 5/2021 | Patil ........................ H04L 63/102 |
| 2021/0152555 A1* | 5/2021 | Djosic ................. H04L 63/1425 |
| 2021/0256126 A1 | 8/2021 | Yan |

FOREIGN PATENT DOCUMENTS

| | | |
|---|---|---|
| KR | 102233078 B1 | 3/2021 |
| WO | 2007009255 A1 | 1/2007 |
| WO | 2012058487 A2 | 5/2012 |
| WO | 2019226363 A1 | 11/2019 |

OTHER PUBLICATIONS

U.S. Appl. No. 17/326,253—Final Office Action dated Jan. 11, 2022, 21 pgs.
Cheng et al., "Cloud Security For Dummies, Netskope Special Edition," John Wiley & Sons, Inc., dated 2015, 53 pages.
"The Netskope Advantage: Three "Must-Have" Requirements for Cloud Access Security Brokers", Jul. 2015, WP-12-2, 4 pages.
"Netskope The 15 Critical CASB Use Cases", Netskope Inc., EB-141-1, dated 2015, 19 pages.
Netskope, Netskope Active Cloud DLP, dated 2015, 4 pages.
"Cloud Data Loss Prevention Reference Architecture", Netskope, Sep. 2015, WP-88-1, 2 pages.
"The Netskope Active Platform Enabling Safe Migration to the Cloud", Apr. 2015, DS-1-8, Netskope, Inc., 6 pages.
U.S. Appl. No. 17/326,253—NonFinal Office Action dated Sep. 8, 2021, 9 pgs.
U.S. Appl. No. 17/326,240, filed May 20, 2021, Issued.
U.S. Appl. No. 17/326,253, filed May 20, 2021, Pending.
PCT/US2022/030133—International Search Report and Written Opinion dated Sep. 6, 2022.

* cited by examiner

Apps 204

| Users 282 | Google Gmail | Google Cloud Storage | Google App Suite | Google Drive | Google Keep | Google AdWords | EchoSign for Google Docs | Google Maps | Google Admin | Google Analytics | Google Groups | Google Calendar | Google Hangouts |
|---|---|---|---|---|---|---|---|---|---|---|---|---|---|
| Aranc | 22 | 0 | 19 | 153 | 0 | 0 | 0 | 0 | 0 | 0 | 0 | 0 | 0 |
| Asa | 304 | 0 | 0 | 145 | 0 | 0 | 0 | 0 | 0 | 0 | 0 | 0 | 0 |
| B | 12 | 0 | 3 | 1 | 0 | 0 | 0 | 0 | 0 | 0 | 0 | 0 | 0 |
| B | 0 | 0 | 0 | 3 | 0 | 0 | 0 | 0 | 0 | 0 | 0 | 0 | 2 |
| BK | 32 | 0 | 24 | 1 | 0 | 0 | 0 | 0 | 0 | 0 | 0 | 0 | 0 |
| BMc | 108 | 0 | 95 | 10 | 0 | 0 | 0 | 0 | 0 | 0 | 0 | 0 | 0 |
| Bmcphe | 0 | 0 | 0 | 5 | 0 | 0 | 0 | 0 | 0 | 0 | 0 | 0 | 0 |
| Bsa | 35 | 0 | 3 | 30 | 0 | 0 | 0 | 0 | 0 | 0 | 0 | 0 | 0 |
| Bvign | 6 | 0 | 4 | 15 | 0 | 0 | 0 | 0 | 0 | 0 | 0 | 0 | 0 |
| Bha | 11 | 0 | 1 | 4 | 0 | 0 | 0 | 0 | 0 | 0 | 0 | 0 | 0 |
| Bra | 89 | 0 | 0 | 104 | 0 | 0 | 68 | 0 | 0 | 0 | 0 | 13 | 15 |
| Cdanbur | 0 | 0 | 4 | 39 | 0 | 0 | 188 | 0 | 0 | 0 | 0 | 0 | 0 |
| Cmetzk | 4 | 0 | 0 | 2 | 0 | 0 | 0 | 0 | 0 | 0 | 0 | 0 | 0 |
| Cohprec | 0 | 0 | 0 | 29 | 0 | 0 | 0 | 0 | 0 | 0 | 0 | 0 | 0 |
| Cscheibenr | 35 | 0 | 16 | 8 | 0 | 0 | 16 | 0 | 0 | 0 | 0 | 2 | 0 |
| Ch | 0 | 0 | 0 | 7 | 0 | 0 | 0 | 0 | 0 | 0 | 0 | 0 | 0 |
| Chollongswc | 0 | 0 | 1 | 5 | 0 | 0 | 4 | 0 | 0 | 0 | 0 | 0 | 0 |
| Ci | 0 | 0 | 0 | 107 | 0 | 0 | 0 | 0 | 0 | 0 | 0 | 0 | 0 |
| Cyo | 43 | 0 | 0 | 34 | 0 | 0 | 0 | 0 | 0 | 0 | 0 | 0 | 0 |
| Dcot | 13 | 0 | 2 | 41 | 0 | 0 | 0 | 0 | 0 | 0 | 0 | 0 | 0 |

FIG. 2B

```
{
    "_id" : "1806e8792a349452c8ec89b0",
    "acm" : "API Connector",
    "act" : "Upload",
    "ap" : "Microsoft Office 365 OneDrive for Business",
    "appact" : "FileUploaded",
    "sid" : NumberLong("3667481216735680"),
    "fur" : "user1@test",
    "inid" : "xxx",
    "obj" : "somefile",
    "oid" : "982d70e3-a388-44f9-8ebe-b457c221a00d",
    "obt" : "File",
    "sip":"0.0.0.0",
    "ts" : 1619226237,
    "ty" : "uba",
    "ur" : "user1@test",
    "urip":"1.1.1.1",
    "os" : "unknown",
    "dv" : "unknown",
    "br" : "unknown",
    "_ssbg" : 1,
    "cn" : 1,
    "tenantid" : "test_tenant",
    "ef_received_at" : NumberLong("1619549586800"),
    "event_id" : "e4b3c779-a132-413c-af71-90dba69a66a1",
    "tid" : "test_tenant",
    "service_identifier" : "service-introspection",
    "ou" : "",
    "sl" : "Delhi",
    "sr" : "Delhi",
    "sc" : "IN",
    "slc" : [
        <PII not shown>
    ],
    "src_geoip_src" : 1,
    "uk" : "user1@test",
    "ur_normalized" : "user1@test",
    "apc" : "Cloud Storage",
    "_category_id" : "7",
    "ste" : "Microsoft Office 365 OneDrive for Business",
    "tty" : "CloudApp",
    "ccl" : "excellent",
    "_its" : 1619227432,
    "pfid" : "custom_apic_single_sequence_upload_policy",
    "anm" : "custom_apic_single_sequence_upload_policy",
    "thr" : 1,
    "thrt" : 60,
    "ety" : "sequence",
    "aty" : "uba",
    "ac" : "anomaly_detection",
    "ack" : "false",
    "app_included" : [ ],
    "app_exluded" : [ ],
    "app_instance_included" : [ ],
    "app_instance_excluded" : [ ],
    "alert_id" : "46c38c16ac8ce830e81e278f2ed47d25",
    "policy_id" : "38",
    "sv" : "informational",
    "policy_name" :
"custom_apic_single_sequence_upload_policy",
    "policy_actions" : [
        "Upload"
    ],
    "orig_ty" : "nspolicy",
    "_cts" : ISODate("2021-04-27T18:53:33.583Z")
}
```

FIG. 3A

```
{
  "_id" : "da09c3b514258c3c52d5dbf0",
  "acm" : "API Connector",
  "act" : "Upload",
  "ap" : "Microsoft Office 365 OneDrive for Business",
  "appact" : "FileUploaded",
  "sid" : NumberLong("6802114082877025"),
  "fur" : "user1@test",
  "inid" : "xxx",
  "obj" : "somefile",
  "oid" : "<PII not shown>",
  "obt" : "File",
  "sip":"0.0.0.0",
  "ts" : 1619226531,
  "ty" : "uba",
  "ur" : "user1@test",
  "urip":"1.1.1.1",
  "os" : "unknown",
  "dv" : "unknown",
  "br" : "unknown",
  "ssbg" : 1,
  "cn" : 1,
  "tenantid" : "test_tenant",
  "_ef_received_at" : NumberLong("1619549722080"),
  "_event_id" : "0a1033b4-c2b5-475e-abbb-651bfa5279cc",
  "tid" : "test_tenant",
  "_service_identifier" : "service-introspection",
  "ou" : ,
  "sl" : "Dubai",
  "sr" : "Dubayy",
  "sc" : "AE",
  "slc" : [
      <PII not shown>
  ],
  "src_geoip_src" : 1,
  "uk" : "user1@test",
  "ur_normalized" : "user1@test",
  "apc" : "Cloud Storage",
  "_category_id" : "7",
  "ste" : "Microsoft Office 365 OneDrive for Business",
  "tty" : "CloudApp",
  "ccl" : "excellent",
  "_its" : 1619227733,
  "pfid" :
    "custom_apic_single_sequence_upload_policy",
  "anm" :
    "custom_apic_single_sequence_upload_policy",
  "thr" : 1,
  "thrt" : 60,
  "ety" : "sequence",
  "aty" : "uba",
  "ac" : "anomaly_detection",
  "ack" : "false",
  "app_included" : [],
  "app_exluded" : [],
  "app_instance_included" : [],
  "app_instance_excluded" : [],
  "alert_id" : "5079ea239ee9dff46aa2368df7afbfcc",
  "policy_id" : "38",
  "sv" : "informational",
  "policy_name" :
    "custom_apic_single_sequence_upload_policy",
  "policy_actions" : [
      "Upload"
  ],
  "orig_ty" : "nspolicy",
  "_cts" : ISODate("2021-04-27T18:56:11.715Z")
}
```

FIG. 3B

```
{
  "_id" : "17d9bb2aa6462c2f4de8ada7",
  "acm" : "API Connector",
  "act" : "Upload",
  "ap" : "Microsoft Office 365 OneDrive for Business",
  "appact" : "FileUploaded",
  "sid" : NumberLong("8730814393162136"),
  "fur" : "user1@test",
  "inid" : "xxx",
  "obj" : "somefile",
  "oid" : "<PII not shown>",
  "obt" : "File",
  "sip" : "0.0.0.0",
  "ts" : 1619226943,
  "ty" : "uba",
  "ur" : "user1@test",
  "urip" : "1.1.1.1",
  "os" : "unknown",
  "dv" : "unknown",
  "br" : "unknown",
  "ou" : "",
  "ssbg" : 1,
  "cn" : 1,
  "tenantid" : "test_tenant",
  "_ef_received_at" : NumberLong("1619549834817"),
  "_event_id" : "e823eb0d-b3aa-4b06-b98d-4ce2b09c72b8",
  "_tid" : "test_tenant",
  "_service_identifier" : "service-introspection",
  "sl" : "Phoenix",
  "sr" : "Arizona",
  "sc" : "US",
  "sz" : "85017",
  "slc" : [
    -112.1235,
    33.5141
  ],
  "src_geoip_src" : 2,
  "uk" : "user1@test",
  "ur_normalized" : "user1@test",
  "apc" : "Cloud Storage",
  "_category_id" : "7",
  "ste" : "Microsoft Office 365 OneDrive for Business",
  "tty" : "CloudApp",
  "ccl" : "excellent",
  "_its" : 1619228030,
  "pfid" : "Bulk Upload",
  "anm" : "Bulk Upload",
  "thr" : 7,
  "thrt" : 3600,
  "ety" : "sequence",
  "aty" : "uba",
  "ac" : "anomaly_detection",
  "ack" : "false",
  "app_included" : [],
  "app_exluded" : [],
  "app_instance_included" : [],
  "app_instance_excluded" : [],
  "alert_id" : "67311d7f4ddec56156695f6b6999769e",
  "policy_id" : "-1",
  "sv" : "critical",
  "policy_name" : "Bulk Upload",
  "policy_actions" : [
    "Upload"
  ]
} 366
"orig_ty" : "nspolicy",
"_cts" : ISODate("2021-04-27T18:57:52.408Z")
```

FIG. 3C

```
{
  "id" : "83df2f9be78aa4870241b932",
  "acm" : "API Connector",
  "act" : "Upload",
  "ap" : "Microsoft Office 365 OneDrive for Business",
  "appact" : "FileUploaded",
  "sid" : NumberLong("1588965488087384"),
  "fur" : "user1@test",
  "inid" : "xxx",
  "obj" : "somefile",
  "oid" : "<PII not shown>",
  "obt" : "File",
  "sip":"0.0.0.0",
  "ts" : 1619237409,
  "ty" : "uba",
  "ur" : "user1@test",
  "urip":"1.1.1.1",
  "os" : "unknown",
  "dv" : "unknown",
  "br" : "unknown",
  "ssbg" : 1,
  "cn" : 1,
  "tenantid" : "test_tenant",
  "ef_received_at" : NumberLong("1619556177232"),
  "event_id" : "871bd327-ffd5-42c1-82ec-55d069d48273",
  "tid" : "test_tenant",
  "service_identifier" : "service-introspection",
  "ou" : ,
  "sl" : "Dubai",
  "sf" : "Dubayy",
  "sc" : "AE",
  "slc" : [
    <PII not shown>
  ],
  "src_geoip_src" : 1,
  "uk" : "user1@test",
  "ur_normalized" : "user1@test",
  "apc" : "Cloud Storage",
  "category_id" : "7",
  "ste" : "Microsoft Office 365 OneDrive for Business",
  "tty" : "CloudApp",
  "ccl" : "excellent",
  "its" : 1619238629,
  "pfid" : ,
  "custom_apic_single_sequence_upload_policy",
  "anm" : ,
  "custom_apic_single_sequence_upload_policy",
  "thr" : 2,
  "thrt" : 60,
  "ety" : "sequence",
  "aty" : "uba",
  "ac" : "anomaly_detection",
  "ack" : "false",
  "app_included" : [],
  "app_exluded" : [],
  "app_instance_included" : [],
  "app_instance_excluded" : [],
  "alert_id" : "d9bcbb9e86e6c62d49ea58118912bdd7",
  "policy_id" : "38",
  "sv" : "informational",  ← 365
  "policy_name" : ,
  "custom_apic_single_sequence_upload_policy",
  "policy_actions" : [
    "Upload"
  ],
  "orig_ty" : "nspolicy",
  "cts" : ISODate("2021-04-27T20:43:27.420Z")
}
```

FIG. 3D

```
{
  "_id" : "64e9ebc7fc7f59e221c852e0",
  "acm" : "API Connector",
  "act" : "Delete",
  "ap" : "Microsoft Office 365 OneDrive for Business",
  "appact" : "FolderDeleted",
  "sid" : NumberLong("7439284640890296"),
  "fur" : "user1@test",
  "inid" : "xxx",
  "obj" : "somefile",
  "oid" : "<PII not shown>",
  "obt" : "Folder",
  "sip" : "0.0.0.0",
  "ts" : 1619315087,
  "ty" : "uba",
  "ur" : "user1@test",
  "urip" : "1.1.1.1",
  "os" : "unknown",
  "dv" : "unknown",
  "br" : "unknown",
  "_ssbg" : 1,
  "cn" : 1,
  "tenantid" : "test_tenant",
  "_ef_received_at" : NumberLong("1619618641418"),
  "event_id" : "5127535d-f3fa-4192-910b-265d8aea08bf",
  "_tid" : "test_tenant",
  "_service_identifier" : "service-introspection",
  "ou" : "",
  "sl" : "Paris",
  "sr" : "Paris",
  "sc" : "FR",
  "sz" : "75017",
  "slc" : [
      2.4075,
      48.8323
  ],
  "src_geoip_src" : 2,
  "uk" : "user1@test",
  "ur_normalized" : "user1@test",
  "apc" : "Cloud Storage",
  "_category_id" : "7",
  "ste" : "Microsoft Office 365 OneDrive for Business",
  "tty" : "CloudApp",
  "ccl" : "excellent",
  "_its" : 1619316398,
  "pfid" : "Bulk Delete",
  "anm" : "Bulk Delete",
  "thr" : 1,
  "thrt" : 3600,
  "ety" : "sequence",
  "aty" : "uba",
  "ac" : "anomaly_detection",
  "ack" : "false",
  "app_included" : [],
  "app_exluded" : [],
  "app_instance_included" : [],
  "app_instance_excluded" : [],
  "alert_id" : "20d326b331d5e6177b94326f387494ee",
  "policy_id" : "-3",
  "sv" : "medium",              ── 355
  "policy_name" : "Bulk Delete",
  "policy_actions" : [
      "Delete"
  ],
  "orig_ty" : "nspolicy",
  "_cts" : ISODate("2021-04-28T14:04:27.149Z")
}
```

FIG. 3E

| | user | time | alert_type | severity | datetime |
|---|---|---|---|---|---|
| 0 | user1@test | 2021-04-27 18:53:33.583 | sequence | informational | 2021-04-27 18:53:33.583 |
| 1 | user1@test | 2021-04-27 18:56:11.715 | sequence | informational | 2021-04-27 18:56:11.715 |
| 2 | user1@test | 2021-04-27 18:57:52.408 | sequence | critical | 2021-04-27 18:57:52.408 |
| 3 | user1@test | 2021-04-27 20:43:27.420 | sequence | informational | 2021-04-27 20:43:27.420 |
| 4 | user1@test | 2021-04-28 14:04:27.149 | sequence | medium | 2021-04-28 14:04:27.149 |
| 5 | user2@test | 2021-04-26 21:59:47.374 | sequence | high | 2021-04-26 21:59:47.374 |
| 6 | user2@test | 2021-04-28 03:04:49.652 | sequence | high | 2021-04-28 03:04:49.652 |
| 7 | user2@test | 2021-04-28 18:34:25.451 | sequence | medium | 2021-04-28 18:34:25.451 |
| 8 | user2@test | 2021-04-28 18:34:25.456 | sequence | medium | 2021-04-28 18:34:25.456 |
| 9 | user2@test | 2021-04-29 15:48:19.871 | sequence | high | 2021-04-29 15:48:19.871 |
| 10 | user3@test | 2021-04-24 18:10:02.878 | sequence | medium | 2021-04-24 18:10:02.878 |
| 11 | user3@test | 2021-04-24 18:10:16.334 | sequence | medium | 2021-04-24 18:10:16.334 |
| ... | | | | | |
| 19 | user4@test | 2021-04-28 00:04:04.703 | sequence | medium | 2021-04-28 00:04:04.703 |
| 20 | user5@test | 2021-04-28 17:04:23.819 | batch | medium | 2021-04-28 17:04:23.819 |
| 21 | user5@test | 2021-04-28 16:04:10.184 | batch | medium | 2021-04-28 16:04:10.184 |
| 22 | user5@test | 2021-04-27 19:03:58.449 | batch | medium | 2021-04-27 19:03:58.449 |
| 23 | user5@test | 2021-04-27 20:03:23.846 | batch | medium | 2021-04-27 20:03:23.846 |
| 24 | user5@test | 2021-04-28 15:16:18.345 | sequence | medium | 2021-04-28 15:16:18.345 |
| 25 | user5@test | 2021-04-28 13:04:34.608 | batch | medium | 2021-04-28 13:04:34.608 |
| 26 | user6@test | 2021-04-27 13:03:57.982 | batch | medium | 2021-04-27 13:03:57.982 |

FIG. 4

| | user1@test | user2@test | user3@test | user4@test | user5@test | user6@test |
|---|---|---|---|---|---|---|
| 2021-04-23 | 1000 | 1000 | 1000 | 1000 | 1000 | 1000 |
| 2021-04-24 | 1000 | 1000 | 1000 | 1000 | 1000 | 1000 |
| 2021-04-25 | 1000 | 1000 | 970.819 | 1000 | 1000 | 1000 |
| 2021-04-26 | 1000 | 1000 | 957.398 | 990.7 | 1000 | 1000 |
| 2021-04-27 | 1000 | 960.477 | 964.541 | 962.128 | 1000 | 1000 |
| 2021-04-28 | 922.398 | 966.191 | 971.684 | 963.557 | 980.528 | 990.651 |
| 2021-04-29 | 924.417 | 917.532 | 978.827 | 966.41 | 954.789 | 962.73 |
| 2021-04-30 | 957.274 | 893.769 | 985.97 | 972.054 | 961.932 | 985.597 |
| 2021-05-01 | 950.132 | 913.769 | 993.113 | 968.038 | 969.075 | 988.444 |
| 2021-05-02 | 962.989 | 933.769 | 990.436 | 975.181 | 976.218 | 991.301 |
| 2021-05-03 | 975.846 | 953.769 | 1000 | 981.624 | 983.361 | 994.158 |
| 2021-05-04 | 988.703 | 973.292 | 1000 | 987.339 | 990.504 | 997.015 |
| 2021-05-05 | 999.162 | 987.578 | 1000 | 993.053 | 997.118 | 999.222 |
| 2021-05-06 | 1000 | 996.237 | 1000 | 997.343 | 1000 | 1000 |
| 2021-05-07 | 1000 | 1000 | 1000 | 998.842 | 1000 | 1000 |
| 2021-05-08 | 1000 | 1000 | 1000 | 1000 | 1000 | 1000 |

FIG. 5

CALIBRATING USER CONFIDENCE IN COMPLIANCE WITH AN ORGANIZATION'S SECURITY POLICIES

RELATED CASES

This application is related to the following contemporaneously filed applications which are incorporated by reference for all purposes as if fully set forth herein:

U.S. Non-Provisional patent application titled "Scoring Confidence in User Compliance with an Organization's Security Policies", filed on 20 May 2021 Ser. No. 17/326,240; and U.S. Non-Provisional patent application titled "Reducing False Detection of Anomalous User Behavior on a Computer Network", filed on 20 May 2021 Ser. No. 17/326,253.

INCORPORATIONS

The following materials are incorporated by reference in this filing:

"KDE Hyper Parameter Determination," Yi Zhang et al., Netskope, Inc.

U.S. Non Provisional application Ser. No. 15/256,483, entitled "Machine Learning Based Anomaly Detection", filed Sep. 2, 2016 (now U.S. Pat. No. 10,270,788, issued Apr. 23, 2019);

U.S. Non Provisional application Ser. No. 16/389,861, entitled "Machine Learning Based Anomaly Detection", filed Apr. 19, 2019 (now U.S. Pat. No. 11,025,653, issued Jun. 1, 2021);

U.S. Non Provisional application Ser. No. 14/198,508, entitled "Security For Network Delivered Services", filed Mar. 5, 2014 (now U.S. Pat. No. 9,270,765, issued Feb. 23, 2016);

U.S. Non Provisional application Ser. No. 15/368,240 entitled "Systems and Methods of Enforcing Multi-Part Policies on Data-Deficient Transactions of Cloud Computing Services", filed Dec. 2, 2016 (now U.S. Pat. No. 10,826,940, issued Nov. 3, 2020) and U.S. Provisional Application 62/307,305 entitled "Systems and Methods of Enforcing Multi-Part Policies on Data-Deficient Transactions of Cloud Computing Services", filed Mar. 11, 2016;

"Cloud Security for Dummies, Netskope Special Edition" by Cheng, Ithal, Narayanaswamy, and Malmskog, John Wiley & Sons, Inc. 2015;

"Netskope Introspection" by Netskope, Inc.;

"Data Loss Prevention and Monitoring in the Cloud" by Netskope, Inc.;

"The 5 Steps to Cloud Confidence" by Netskope, Inc.;

"Netskope Active Cloud DLP" by Netskope, Inc.;

"Repave the Cloud-Data Breach Collision Course" by Netskope, Inc.; and

"Netskope Cloud Confidence Index™" by Netskope, Inc.

FIELD OF THE TECHNOLOGY DISCLOSED

The technology disclosed generally relates to behavior analytics for quantifying overall riskiness of a user so that security administrators can readily identify the top risky users and take appropriate actions. More specifically, the disclosed technology relates to determining a user confidence score that reflects user behavior anomalies that indicate potential threats, through machine learning and statistical analysis.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cybercriminals see the cloud as an effective method for subverting detection. Patterns of cyberthreats and malicious insiders change constantly. Meanwhile, sensitive data is increasingly distributed and moving to applications that are not necessarily sanctioned or properly secured.

Eighty-nine percent of enterprise users are active in managed and unmanaged cloud services and apps, with twenty percent of users moving sensitive data laterally among multiple apps and services, while more than thirty percent of enterprise users work remotely on average.

Security policies often need to be evaluated for individual users in real time, for example, when users are uploading and downloading files, browsing websites or accessing data in the cloud. Millions of critical decisions that impact user experience need to be made every day.

An opportunity arises for evaluating user compliance with an organization's security policies, and for calibrating a user confidence or risk score that expresses evaluation of user behavior that was not compliant with an organization's security policies, to enable an administrator to review a user group and take appropriate actions for individual users, based on the security risks they pose. An opportunity also emerges for reducing false detection of anomalous user behavior on a computer network.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 2B shows an example list of app events for a group of users, for use by batch alert detectors, with the count of events by each user for each of a list of apps.

FIG. 3A through FIG. 3E list a set of alerts for a single user.

FIG. 3A shows user data for an alert with informational severity.

FIG. 3B describes another alert for the same user, also with informational severity.

FIG. 3C shows a critical severity alert for the user.

FIG. 3D lists an informational severity alert.

FIG. 3E shows a medium severity alert for the same user.

FIG. 4 shows a snippet of the alert summary for a set of six users, including the time the alert occurred and the severity, for alert types of both sequence and batch.

FIG. 5 shows confidence scores calculated for each of sixteen days for each of six users.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

There is a need to quantify the overall riskiness of a user so that security administrators at an enterprise can readily identify the risky users and take appropriate actions, such as blocking access to sensitive files and stopping intrusion attacks.

The disclosed technology utilizes behavior analytics to uncover anomalous user behavior and assess how risky or trustworthy a user is, for detecting and blocking malicious insiders, compromised accounts, data exfiltration and other threats.

The disclosed technology also enables calibration of a user confidence or risk score that expresses evaluation of user behavior that was not compliant with an organization's security policies. In this document, enterprise and organization are used interchangeably.

Existing technology that compares user behavior to both user and group profiles utilizes all of the users of a customer as a proxy for peer group. This approach is not granular enough to provide information that effectively reduces the incidence of false positives.

In User and Entity Behavior Analytics (UEBA), a security alert is generated if a user or an entity behaves differently. Such "different behavior" is detected by comparing the user/entity with its own history, and/or the history of its peers. Therefore, the determination of "peers" becomes an important step in UEBA.

The disclosed technology uses grouping of peer users into groups based on apps used and based on location enables user and entity behavior analytics (UEBA) that are resilient and reduces the incidence of false positives, by comparing user behavior to both user and peer group profiles.

The technology disclosed solves the technical problem of quantifying the incidence and severity of anomalous user behavior that indicates potential security threats, through machine learning and statistical analysis. User confidence scores are designed to fulfill this important need.

An example system for evaluating user compliance with an organization's security policies, calibrating a user confidence or risk score that expresses evaluation of user behavior that was not compliant with an organization's security policies, and for reducing false detection of anomalous user behavior on a computer network, is described next.

Architecture

Figure 1:
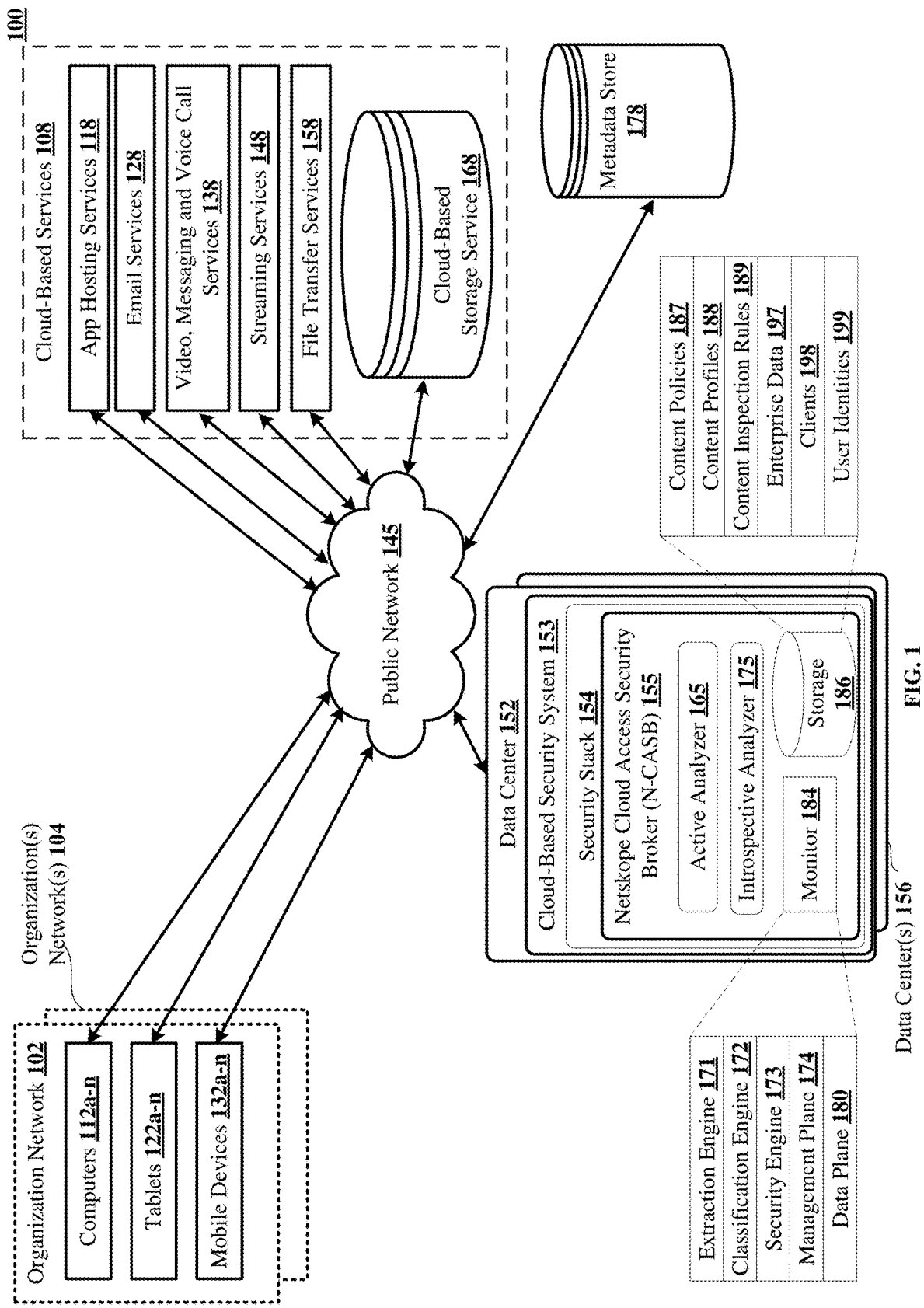
FIG. 1 illustrates an architectural level schematic of a system for evaluating user compliance with an organization's security policies, calibrating a user confidence or risk score that expresses evaluation of user behavior that was not compliant with an organization's security policies, and for reducing false detection of anomalous user behavior on a computer network, in accordance with an implementation of the technology disclosed.

FIG. 1 shows an architectural level schematic of a system 100 for evaluating user compliance with an organization's security policies, and for calibrating a user confidence or risk score that expresses evaluation of user behavior that was not compliant with an organization's security policies. These functionalities enable an administrator to review a user group and take appropriate actions for individual users, based on the security risks they pose. System 100 also includes functionality for reducing false detection of anomalous user behavior on a computer network. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

System 100 includes organization network 102, data center 152 with unified cloud-based security system 153, with security stack 15 and Netskope cloud access security broker (N-CASB) 155 and cloud-based services 108. System 100 includes multiple organization networks 104 for multiple subscribers, also referred to as multi-tenant networks, of a security services provider and multiple data centers 156. Organization network 102 includes computers 112a-n, tablets 122a-n and mobile devices 132a-n. In another organization network, organization users may utilize additional devices. Cloud services 108 includes cloud-based hosting services 118, web email services 128, video, messaging, and voice call services 138, streaming services 148, file transfer services 158, and cloud-based storage service 168. Data center 152 connects to organization network 102 and cloud-based services 108 via public network 145. Netskope cloud access security broker (N-CASB) 155, between cloud service consumers and cloud service providers, combines and interjects enterprise security policies as cloud-based resources are accessed.

Continuing with the description of FIG. 1, each security layer of security stack 154 can detect issues. Enhanced Netskope cloud access security broker (N-CASB) 155 securely processes P2P traffic over BT, FTP and UDP-based streaming protocols as well as Skype, voice, video and messaging multimedia communication sessions over SIP, and web traffic over other protocols, in addition to governing access and activities in sanctioned and unsanctioned cloud apps, securing sensitive data and preventing its loss, and protecting against internal and external threats. N-CASB 155 includes active analyzer 165 and introspective analyzer 175 that identify the users of the system and set policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes. As an example, Box™ storage application provides an admin API called the Box Content API™ that provides visibility into an organization's accounts for all users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes. In a callback model, introspective analyzer 175 registers with the cloud-based services via API connectors to be informed of any significant events. For example, introspective analyzer 175 can use Microsoft Office365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data. For further information regarding the functionality of active analyzer and introspective analyzer, reference can be made to, for example, commonly owned U.S. Pat. Nos. 9,398,102; 9,270,765; 9,928,377; and U.S. patent application Ser. No. 15/368,246;

Continuing further with the description of FIG. 1, N-CASB 155 further includes monitor 184 that includes extraction engine 171, classification engine 172, security engine 173, management plane 174 and data plane 180. Also included in N-CASB 155, storage 186 includes content policies 187, content profiles 188, content inspection rules 189, enterprise data 197, information for clients 198 and user identities 199. Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or corporate identity directory but is distinct from it. In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g., Microsoft's Active Directory (AD). Such embodiments may allow policies to be defined in the directory, e.g., either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g. a dedicated account held by the system that holds the only credentials to sign in to the service. In other embodiments, the client may encrypt the sign on credentials before passing the login to the hosted service, meaning that the networking security system "owns" the password.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175. For instance, the assembled metadata is stored in a semi-structured data format like a JSON (JavaScript Object Notation), B SON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 178 like Apache Cassandra™, Google's Bigtable™, HBase™ Voldemort™, CouchDB™, MongoDB™, Redis™, Riak™, Neo4j™, etc., which stores the parsed JSON objects using key spaces that are equivalent to a database in SQL. Each key space is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parsing or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata. In one use case, the identification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

Continuing further with the description of FIG. 1, system 100 can include any number of cloud-based services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™ Amazon AWS™, Microsoft Office 365™, Workday™, Oracle on Demand™, Taleo™, Yammer™, Jive™, and Concur™.

In the interconnection of the elements of system 100, network 145 couples computers 112*a-n*, tablets 122*a-n* and mobile devices 132*a-n*, cloud-based hosting service 118, web email services 128, video, messaging and voice call services 138, streaming services 148, file transfer services 158, cloud-based storage service 168 and N-CASB 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, N-CASB 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing N-CASB 155 on direct physical computers or traditional virtual machines. Additionally, one or more engines can be used and one or more points of presence (POPs) can be established to implement the security functions. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs are hosted on the client's premises or located in a virtual private network controlled by the client.

N-CASB 155 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102. Although we use the term "network security system" to describe N-CASB 155, more generally the system provides application visibility and control functions as well as security. In one example, thirty-five thousand cloud applications are resident in libraries that intersect with servers in use by computers 112*a-n*, tablets 122*a-n* and mobile devices 132*a-n* in organization network 102.

Computers 112*a-n*, tablets 122*a-n* and mobile devices 132*a-n* in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies. In such implementations, management clients can include one or more servers, e.g. a corporate identities directory such as a Microsoft Active Directory (AD) or an implementation of open Lightweight Directory Access Protocol (LDAP) pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g. read-only vs. read-write.

In addition to periodically generating the user-by-user data and the file-by-file data and persisting it in metadata store 178, an active analyzer and introspective analyzer (not shown) also enforce security policies on the cloud traffic. For further information regarding the functionality of active analyzer and introspective analyzer, reference can be made to, for example, commonly owned U.S. Pat. Nos. 9,398,102; 9,270,765; 9,928,377; and U.S. patent application Ser. No. 15/368,246; Cheng, Ithal, Narayanaswamy and Malmskog *Cloud Security For Dummies, Netskope Special Edition*, John Wiley & Sons, Inc. 2015; "*Netskope Introspection*" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud Confidence*" by Netskope, Inc.; "*The Netskope Active Platform*" by Netskope, Inc.; "*The Netskope Advantage: Three "Must-Have" Requirements for Cloud Access Security Brokers*" by Netskope, Inc.; "*The 15 Critical CASB Use Cases*" by Netskope, Inc.; "*Netskope Active Cloud DLP*" by Netskope, Inc.; "*Repave the Cloud-Data Breach Collision*

*Course*" by Netskope, Inc.; and "*Netskope Cloud Confidence Index*™" by Netskope, Inc., which are incorporated by reference for all purposes as if fully set forth herein.

For system 100, a control plane may be used along with or instead of management plane 174 and data plane 180. The specific division of functionality between these groups is an implementation choice. Similarly, the functionality can be highly distributed across a number of points of presence (POPs) to improve locality, performance and/or security. In one implementation, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Figure 2A:
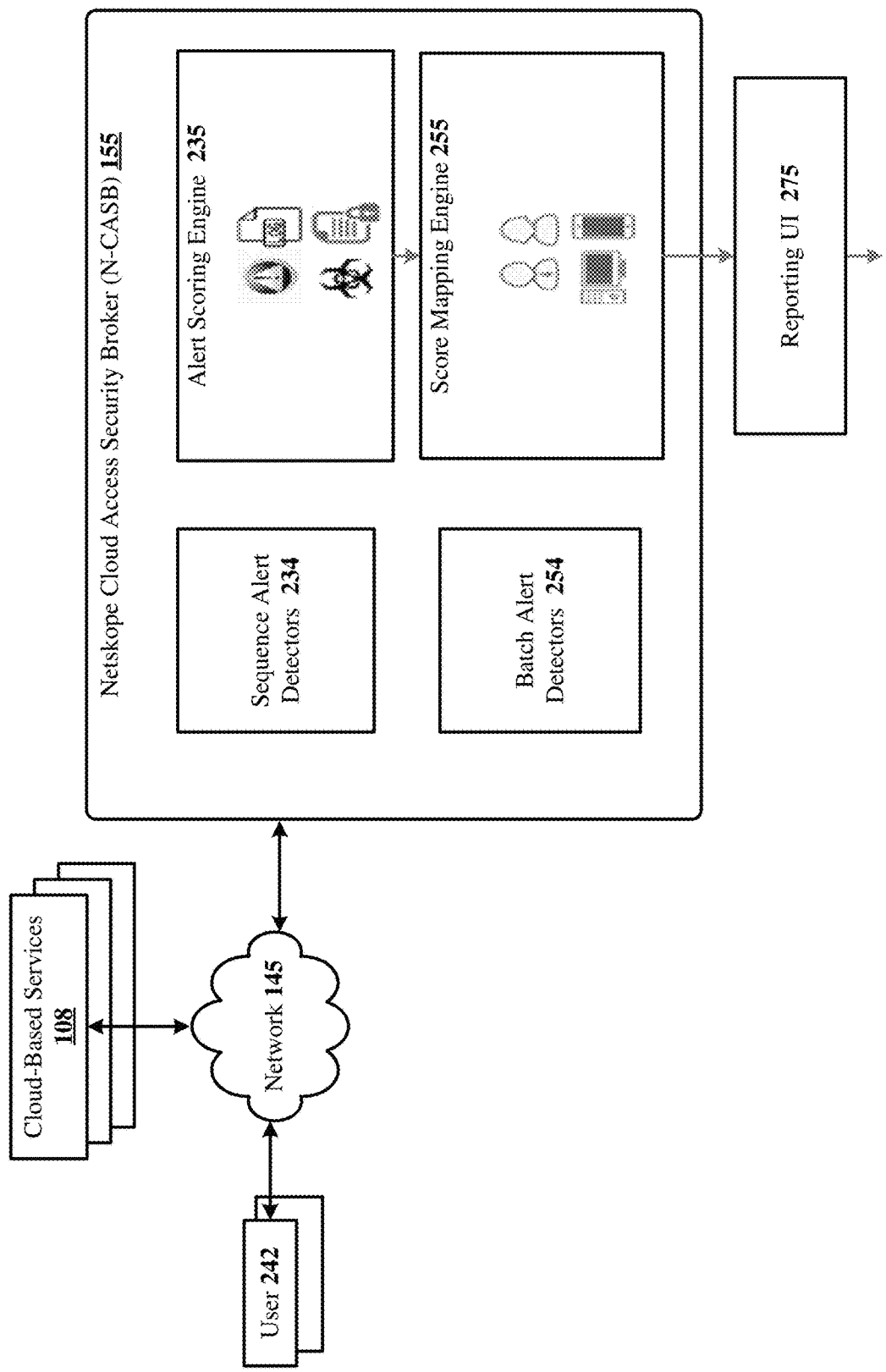
FIG. 2A illustrates a high-level block diagram of Netskope cloud access security broker with user utilizing cloud based services via a network, for evaluating user compliance with an organization's security policies.

FIG. 2A illustrates a high level block diagram 200 of Netskope cloud access security broker (N-CASB) 155 with user 202 utilizing cloud based services 108 via network 145. User 202 can operate any of a variety of devices in organization network 102, such as computers 112*a-n*, tablets 122*a-n* and mobile devices 132*a-n*. N-CASB 155 can control web applications and operations like login, file transfer and sharing, and detect anomalies in the data and accesses. Security functions include access control, risk assessment, malware detection and user and entity behavior analytics (UEBA) for identifying anomalous behavior.

Continuing the description of FIG. 2A, N-CASB 155 includes alert scoring engine 235 and score mapping engine 255. Alert scoring engine 235 formulates a user confidence or risk score, scoring for each user a sum of alert weights, categorized by severity, and generated over time. Each contribution to an alert weight is generated due to an activity by the user that the organization's security policies treat as risky. The alert weights over time are subject to a decay factor that attenuates the alert weights as time passes. Score mapping engine 255 associates scores with users and enterprise entities. User risk score is used to reflect the "risk level" of each user, and therefore the alerts which are not associated with the user are not considered in the risk score calculation. User confidence index (UCI) is 1000 minus the risk score, in one implementation. Risk Score is calculated based on alerts associated with users. It reflects the severity of alerts, and decays over a period of time. The higher the risk score, the more suspicious the user is. Risk score is calculated as shown below.

$$\text{RiskScore} = \Sigma S_i * f_i$$

$S_i$ is the score for a single alert based on the severity level, and $f_i$ is a decay factor for an alert based on when the alert occurred. Time decay factor $f_i$ is used to linearly decay the risk score in one example implementation, in the window of 7 days. In this example, $f_i$ can be $1/7$, $2/7$, $3/7$, $4/7$, $5/7$, $6/7$, and 1 depends on the time of the alerts. Final Risk Score is capped at 1000, in one implementation described herein. The final risk score could be capped differently in another implementation.

An alert severity weight is assigned to each alert based on its severity level. Category caps for alert severity categories are listed in the table below. An example of the use of the severity categories is shown in the UI of s below.

| Alert Severity | Weight | Cap |
| --- | --- | --- |
| Informational | 0 | 0 |
| Low | 5 | 500 |
| Medium | 10 | 500 |
| High | 40 | 800 |
| Critical | 80 | 1000 |

Further continuing the description of FIG. 2A, block diagram 200 also includes reporting UI 275 for displaying reporting of user confidence scores. Reporting includes a time series of the user confidence or risk scores over a predetermined time, and/or a current user confidence or risk score, and/or at least some details of the activity by the user that contributed to the alert weights over time. An example user confidence index report is described and shown relative to FIG. 9 below.

Block diagram 200 also has different Netskope detectors for different kinds of user and entity behavior alerts, including human crafted and machine learning generated alerts. We refer to the human crafted alerts as sequence alerts and to the ML-based alerts as batch alerts. Sequence alert detectors 234 generate sequence alerts upon detection of known behavior patterns for incoming events. Rules are used to describe these patterns as a sequence of events predefined by Netskope or configured by Netskope's customers via the product UI. One example predefined pattern is attempted corporate cloud storage access by users, from known malicious IPs. In an example of a custom pattern configured by customers, a user downloads a file from a particular app Box, and deletes the same file immediately, then repeats this sequence 10 times within 10 minutes. This example sequence of events can be configured to trigger a "Critical" alert.

Groups are used to cluster users/entities to their similar peers. The smallest groups can be the user himself or the entity itself, in which a single peer is shown in the group. The largest group can be the whole tenant, in which every user and every entity is in the same group.

Besides the single peer group and tenant group, there can be many possible groups based on identity and access management (IAM) properties such as from Active Director (AD), locations or other pre-defined logic provided by customers. However, these pre-defined and statically determined groups have their limitations: A user can belong to multiple groups and there is no definition to correlate groups. The AD information, and/or the customer pre-defined groups can be incorrect, outdated, or simply not aligned with the user behavior. Such groups can be statistically too large or too small in some applications.

To overcome the shortcomings from such pre-defined groups, the disclosed dynamic grouping can be very useful. Dynamic grouping can assign user/entity to a group that can best model its behavior based on pre-defined groups. Dynamic grouping can also assign user/entity to a group that can best model its behavior only based on its behaviors (without considering AD, location, and other information). Therefore, dynamic grouping can allow multiple peer groups, which can change over time, based on distance metrics and clustering algorithms.

Batch alert detectors 254 collect user data and use clustering to determine the likelihood that a user belongs to a specific group. Peer groups are generated dynamically based on their behavior patterns, using a machine learning algorithm. Values of user behavior are compared to the behavior values of the per group. Batch alert detectors 254 utilize statistical-based algorithms based on heuristic performance to detect outliers in user behavior, such as a large number of file downloads or uploads that deviate from a user's normal usage behavior, including brute force and malicious insider actions. The disclosed batch alert detectors 254 utilize non-parametric modeling, with kernel density estimation (KDE) applied as a smoothing technique for the finite data samples. For the non-parametric modeling, the hyper parameters for the model are determined, as described in "KDE Hyper Parameter Determination," Yi Zhang et al., Netskope, Inc. which is incorporated in full, herein.

Fields used in risk score/confidence score calculations for these two kinds of alerts are described next. In some examples included in this document, personally identifiable information (PII) is obfuscated, and in some cases numerical values may be modified for adherence to privacy standards for PII. Alert examples include the following fields, among others: (1) "sv" severity of the alert, this string is used to map the alert with severity categories; (2) "ts" timestamp when the event/alert happened, with event timestamp in Unix epoch format, usable in decay factor calculation; (3) "ur": user email string usable to map alerts to a user; (4); "slc": source location; and (5) "p_value": an indicator of how abnormal this alert is. This information exists in batch alerts. That is, p-values are used, optionally, to calculate the abnormality weight.

In one disclosed implementation of batch alert detectors 254, KDE hyper parameter p_value is calculated to obtain a value between three to five times the maximum value in the training data. Values that are less than 3 times the maximum training data value are treated as normal directly (without p_value calculation). Values that are larger than five times the maximum training data are treated as abnormal directly (without p_value calculation). p_value suggested threshold: e-5. Set the bandwidth for file size as 0.05, and for count as 1.5. Bandwidth can be dynamic adjusted with the number of training samples. A smaller number of training samples requires larger bandwidth. Set leaf size to 40.

An example sequence alert is listed below.
{
"ur": "<PII not shown>",
"sv": "high",
"ts": 1607456878,
}

An example batch alert is listed below.
{
"sv": "medium",
"ur": "<PII not shown>",
"ts": 1607554800,
"p_value": {
  "user": 1e-14,
  "tenant": 1e-14
},
}

Batch alert detectors 254 utilize peer grouping to make UEBA more resilient and reduce false positives. Batch alert detectors 254 form groups of users, based on identity and access management (IAM) properties, assigning the users into initially assigned groups based on their respective IAM properties and recording individual user behavior, including application usage frequency. Another example property for assigning groups is affiliation with a common customer. Batch alert detectors 254 dynamically assign an individual user with a realigned group, different from the initial assigned group, based on comparing the recorded individual user behavior, with user behavior in statistical profiles of the users in the groups. Evaluation and reporting of anomalous events among ongoing behavior of the individual user is based on deviations from a statistical profile of the realigned group, and optionally based on deviations from the individual's statistical profile. Users from the same location tend to use similar apps. For example, an engineering group will likely use the same integrated development environment (IDE) tools, and administrative staff members often utilize the same office management tools. Batch alert detectors 254 group users based on app usage, in one implementation with apps determined via the IAM properties. Apps being utilized by a user are gleaned from the data provided by active directory (AD) in one scenario, and the IAM can be open lightweight access protocol (LDAP) in a different implementation.

FIG. 2B shows an example list of app events for a group of users, for use by batch alert detectors 254, with the count of events by each user 282 for each of a list of apps 204. An example of the information gleaned from the IAM, in this example AD, is listed below.

"user_166149": {"ad": ["bcf.pvt/GESTION/GRUPOS/Internet/PX_Ag_Medio",
"bcf.pvt/GESTION/GRUPOS/APPs/CASB"]},
"user_166148": {"ad": ["bcf.pvt/GESTION/GRUPOS/Internet/PX_Staff_Rib"]},
"user_166141": {"ad": ["bcf.pvt/GESTION/GRUPOS/APPs/CASB",
"bcf.pvt/GESTION/GRUPOS/Internet/PX_Ag_Medio"]},
"user_166140": {"ad": ["bcf.pvt/GESTION/GRUPOS/APPs/CASB", "bcf.pvt/GESTION/GRUPOS/Internet/PX_Ag_ Medio"]},
"user_166143": {"ad": ["bcf.pvt/GESTION/GRUPOS/APPs/CASB",
"bcf.pvt/GESTION/GRUPOS/Internet/PX_Ag_ Medio"]},
"user_166142": {"ad": ["bcf.pvt/GESTION/GRUPOS/Internet/PX_Staff_Desarrollo"]},
"user_166145": {"ad": ["bcf.pvt/GESTION/GRUPOS/APPs/CASB",
"bcf.pvt/GESTION/GRUPOS/Internet/PX_Staff_Basico"] },
"user_166144": {"ad": ["bcf.pvt/GESTION/GRUPOS/APPs/CASB",
"bcf.pvt/GESTION/GRUPOS/Internet/PX_Ag_Medio"]}

We describe the dynamic grouping algorithm for app grouping here. In the first step the batch alert detector calculates the size of each app group. In this step, original assigned groups are utilized for each user. For the example listed above, user_166149 is counted in the group bcf.pvt/GESTION/GRUPOS/Internet/PX_Ag_Medio and in the group bcf.pvt/GESTION/GRUPOS/APPs/CASB, while user_166148 is only included in group bcf.pvt/GESTION/GRUPOS/Internet/PX_Staff_Rib. The groups are filtered based on their size, to filter out invalid groups that are either too small or too large. A group which is too small (usually less than 100 people or 10% of the organization population), or too large (usually more than 500 people or 80% of the whole organization population) will not be considered. The groups under consideration are called valid groups. The next step includes training a one-vs-the-rest classifier for each valid app group, based on the previous week's app usage data. Light Gradient Boosting Machine (LightGBM) is used to train the one-vs-the-rest classifiers for each group. A different one-versus-rest clustering machine can be used in a different implementation. For each group, the users that are counted to the app group are considered as positive instances, while the other users are negative instances. In the next algorithm step, we apply all the classifiers to each user, and assign the group tag to a user if a user is classified as positive in a group with >90% confidence. Then, we sort the tags for each user based on confidence level and other metrics, such as group size.

Listed next is a single event record example, and the text in bold highlights fields used for the dynamic grouping. In this example, the app is Microsoft Office 365 OneDrive for Business, the act is rename, and the source location is Ermington. The source region information is used in generating location groups.

{"_id": "ec3ead7ec4a533778f6b9117", "nsdeviceuid": "0ABB980D-F693-0BE0-0619-BC94A12B66DC",
"src_geoip_src": 2, "tty": "CloudApp", "cn": 1, "_ctg": ["10009", "564", "10002", "10007", "10014", "10003", "10016", "7"], "_notify": "{\"interval\": \"-1\"}", "osv": "Windows 10", "ap": "Microsoft Office 365 OneDrive for Business", "dvc": "not configured", "_tid": "masked PII info", "apc": "Cloud Storage", "_resource_name": "create_edit_delete_file_folder_Mac", "alr": "no", "_cts": "2019-12-12T17:48:09.985Z", "managementID": "32EB063604D0F94-E95D53C0AD7175FBA", "_nshostpop": "AU-MEL1", "dlc": [-93.609108, 41.60054], "inid": "XX", "sip": "x.x.x.x", "page_site": "Microsoft Office 365 OneDrive for Business", "severity": "unknown", "ty": "nspolicy", "_category_id": "10007", "dz": "N/A", "ts": 1576172888, "managed_app": "yes", "ccl": "excellent", "pg": "XXX", "sid": "473700708864-9414810", "cnid": "8897195943229086920", "ur_normalized": "XXX", "urip": "x.x.x.x", "dl": "Des Moines", "sz": "2115", "act": "Rename", "dc": "US", "paid": "3c7a1ac30a134efcab98e6e63a8b3032", "_its": 1576172890, "br": "Native", "plc": "Allow Indo FULL", "os": "Windows 10", "dst_geoip_src": 1, "dv": "Windows Device", "dst_timezone": "N/A", "dr": "Iowa", "ou": "aus.ccamatil.com/Accounts/Users/Restricted", "ste": "Microsoft Office 365 OneDrive for Business", "_nshostname": "dppool4-1-egress", "fur": "XXX", "tlap": " ", "hn": "DESKTOP-0PL522H", "sr": "New South Wales", "txnid": "31231220267662710 40", "brsid": "506476417684-0532216", "acm": "Client", "ur": "XXX", "url": "XXXXX", "obj": "XXX", "uk": "XXX", "sl": "Ermington", "sc": "AU", "_ssbg": "0", "obt": "File", "dip": "x.x.x.x", "slc": [151.0584, -33.8126] }

We describe the dynamic grouping algorithm for locations grouping here. In the first step, we retrieve the location information for each user in the historic event records and generate user statistical profiles, and assign the users into initially assigned groups, as candidate location groups, for each user and filter out invalid location groups based on their sizes. Each user is associated with the location groups that cover 95% of their activities, in one implementation. A different percentage of activities can be utilized in a different implementation. A location group which is too small (usually less than 100 people or 10% of the whole organization population), or too large (usually more than 500 people or 80% of the organization population) will not be considered. The groups under consideration are called valid location groups. For example, if user1 had 1000 event records and the location distribution is Santa Clara: 980, Michigan:20, the user's candidate location group is Santa Clara. If user2 had 1000 event records and the location distribution is Santa Clara: 650, Washington: 200, Beijing:120 and Paris: 30, then user2's candidate location groups are Santa Clara, Wash. and Beijing. This means user1 is counted as a user in Santa Clara group, while user2 is counted in Santa Clara, Wash., and Beijing group. The next step is to filter location groups based on their sizes. A location group which is too small (typically less than 100 people or 10% of the organization population), or too large (typically more than 500 people or 80% of the organization population) will not be considered. The location groups under consideration are called valid location groups. The next step includes training a one-vs-the-rest classifier for each valid location group. We use the previous four weeks of data to train the one-vs-the-rest classifiers for each group, in one implementation. A different one-versus-rest clustering machine can be used in a different implementation. For each location group, the users that are counted to the group are considered as positive instances, while the other users are negative instances. Then we apply all the classifiers to each user, assign the tag to a user if a user is classified as positive in a location group with >90% confidence, and sort the location tags for each user based on confidence level and other metrics such as group size, group pureness, etc. Group pureness refers to how reliably the trained model can describe or represent the group, and in this case is measured by the accuracy of the trained LightGBM model on the training data. For example, after a LightGBM model is well trained (converged), it can achieve 98% accuracy on the training data. Such accuracy indicates that the group is well formed and the model is reliable to be used to determine whether a user belongs to this group. On the other hand, when a LightGBM model, after being well trained, can only achieve 70% accuracy on the training data, it means the group, by nature, is not tightly formed. There may be more variance within the group. Such a model would be less reliable if it is used to determine the user's group.

Batch alert detectors 254 dynamically assign an individual user with a realigned group, different from the initial assigned group, based on comparing the recorded individual user behavior, with user behavior in statistical profiles of the users in the groups. Example location group tags are listed below. Two outputs are a one-vs-the-rest classifier for each group, and each user is assigned to groups to which they are similar, as a result of the process described above. Example grouping output is listed below, for two users, user1 and user2.

"user1": ["switchnet.nv/Switch/_Global/Security Groups/Software Deployments/User/SD_Alber-BatteryAnalysis", "switchnet.nv/Email Distribution Groups/CIOPS-Distros/(DL) CIOPS"]"switchnet.nv/Security Groups/Group Folder Permissions/Global Share RW", "switchnet.nv/Switch/_Global/Applications/Concur/Groups/Concur-Users", "switchnet.nv/Switch/_Global/Applications/RSA/Group s/RSA-VPN-LAS", "switchnet.nv/Email Distribution Groups/(DL) Staff"]

"user2": ["switchnet.nv/Switch/_Global/Security Groups/Software Deployments/User/SD_Alber-BatteryAnalysis", "switchnet.nv/Switch/_Global/Security Groups/Software Deployments/User/SD_AutoHotKey", "switchnet.nv/Email Distribution Groups/CIOPS-Distros/(DL) CIOPS", "switchnet.nv/Security Groups/Group Folder Permissions/Global Share RW", "switchnet.nv/Switch/_Global/Applications/Concur/Groups/Concur-Users", "switchnet.nv/Switch/_Global/Applications/RSA/Group s/RSA-VPN-LAS", "switchnet.nv/Email Distribution Groups/(DL) Staff", "switchnet.nv/Email Distribution Groups/CIOPS-Distros/CiopsTeam", "switchnet.nv/Switch/Global/Web Filters/Reporting Groups/WF-Thomas Morton"]

"user1": ["Las Vegas"]
"user2": ["Las Vegas", "Reno"]
"user3": ["Salt Lake City"]

Figure 2C:
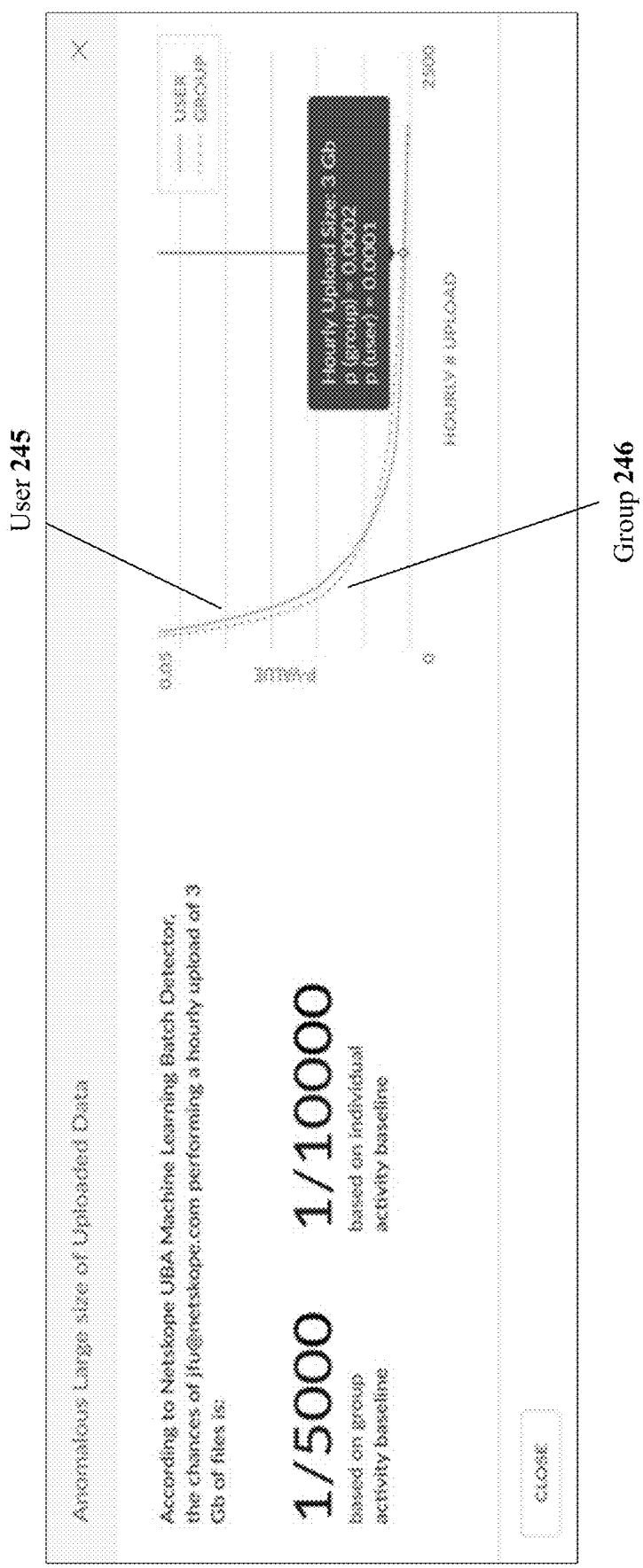
FIG. 2C illustrates an example UI for reporting results for a disclosed user behavior analytics machine learning batch detector.

Batch alert detectors 254 utilize the disclosed dynamic grouping when analyzing a user's current behavior, to determine when an alert needs to be generated, comparing user behavior to both user and group statistical profiles. FIG. 2C illustrates an example UI for reporting results for user behavior analytics (UBA) machine learning batch detector 254. The report shows a user's latest behavior compared with the baseline statistical models of the same user and their peer group in order to identify anomalies, based on the P values. In this example, an anomalous large size of uploaded data is reported. The chances of the particular user 245 performing an hourly upload of 3 Gb of files has likelihood of 1/5000 based on group activity baseline 246 and 1/10000 based on individual activity baseline 245. The user's hourly upload data size was 3 GB, which was highly unlikely compared to the group and user baselines.

Batch alert detectors 254 review an anomalous large size of updated data by the user and report that the chances of the user performing an hourly upload of a 3 GB file is 1/5000 based on the individual activity baseline 245, and 1/10000 based on group activity baseline 246. This results in a higher risk score for the user, also referred to as a lower confidence score.

FIG. 3A through FIG. 3E list the set of alerts for a single user, user1@test (pseudonym). FIG. 3A shows user data for an alert with informational 387 severity, and FIG. 3B describes another alert for the same user, also with informational 386 severity. FIG. 3C shows a critical severity alert 366 for the user. FIG. 3D lists an informational 365 severity alert and FIG. 3E shows a medium severity alert 355 for the same user.

FIG. 4 shows a snippet of the alert summary for a set of six users, including the time the alert occurred and the severity, for alert types of both sequence and batch.

FIG. 5 shows confidence scores calculated for each of sixteen days for each of six users. For confidence scores, the "risky" user has a lower confidence index. In a second example with two hundred thousand plus users, 280 users have scores less than perfect, which is a value of just over one in a thousand. That illustrates that the actions of great majority of users do not take action that are behavior anomalies, so they do not cause the generation of alerts. Admins do need to be able to perform risk mitigation actions for the users who are threats to the enterprise.

In another implementation of the disclosed technology for evaluating user compliance with an organization's security policies, risk score is calculated as described below.

$$RiskScore = Cap - \sum_{i=alerts} S_i \times A_i \times Decay$$

The score is between 0 and a predefined cap. 1000 is used as cap in one implementation. Alert abnormality enhancement with weight Ai represents the amount of deviation from the norm for a particular alert, as determined by the p value. Ai ranges from 1 to 1.2. For detectors with no p value, Ai=1.0. Machine learning (ML) based batch detectors generate the p value in one implementation described above, and the alert abnormality weights are applied to the alerts generated by such detectors. The exponential function can be used to calculate the abnormality weight. Such a weight increases slowly with the increase of p value at the beginning and has a sharp lift on the tail.

User risk score decays over time. By default, only alerts that occurred within the past 90 days will contribute to the score, in one implementation. The tenant admin can configure the user confidence index and risk score system to specify the duration, in some implementations.

Figure 6:
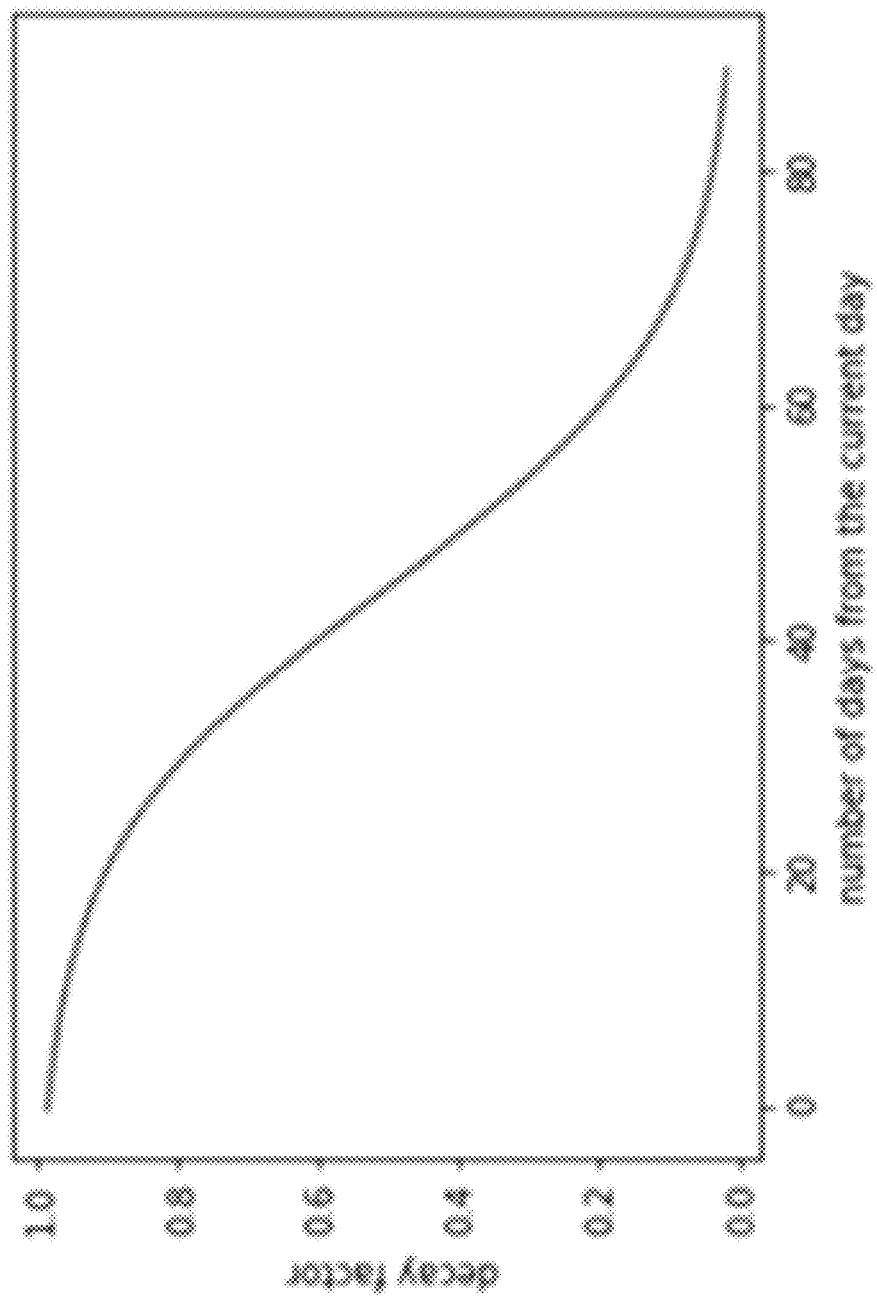
FIG. 6 shows an example decay factor graph of decay factor as a function of the number of days from the current day.

FIG. 6 shows an example decay factor graph of decay factor as a function of the number of days from the current day. A customized sigmoid function is used to generate the decay factor based on the decay window, in one implementation. A logistic function could be used in another implementation. The decay curve is based on a decay window of 90 days and utilizes the scale listed below.

"DecayFactor"={
"0": 1,
"10": 0.95,
"20": 0.90,
"30": 0.85,
"40": 0.70,
"50": 0.5,
"60": 0.25,
"70": 0.15,
"80": 0.12,
"90": 0.10,
"100": 0
}

In the example listed above, when one assumes the decay window is 90 days, a medium alert is worth 10 points on the day it happens, and 9.5 points 9 days later. Alerts older than 90 days do not contribute to the total risk score, due to the decay duration of this example. Different experimentally determined decay factors can be utilized in other implementations of the disclosed technology.

The tenant admin can reset the Risk Score for a particular user in the UI. After reset, the score is set to zero for a configurable time period, such as 7 or 30 days.

Figure 7:
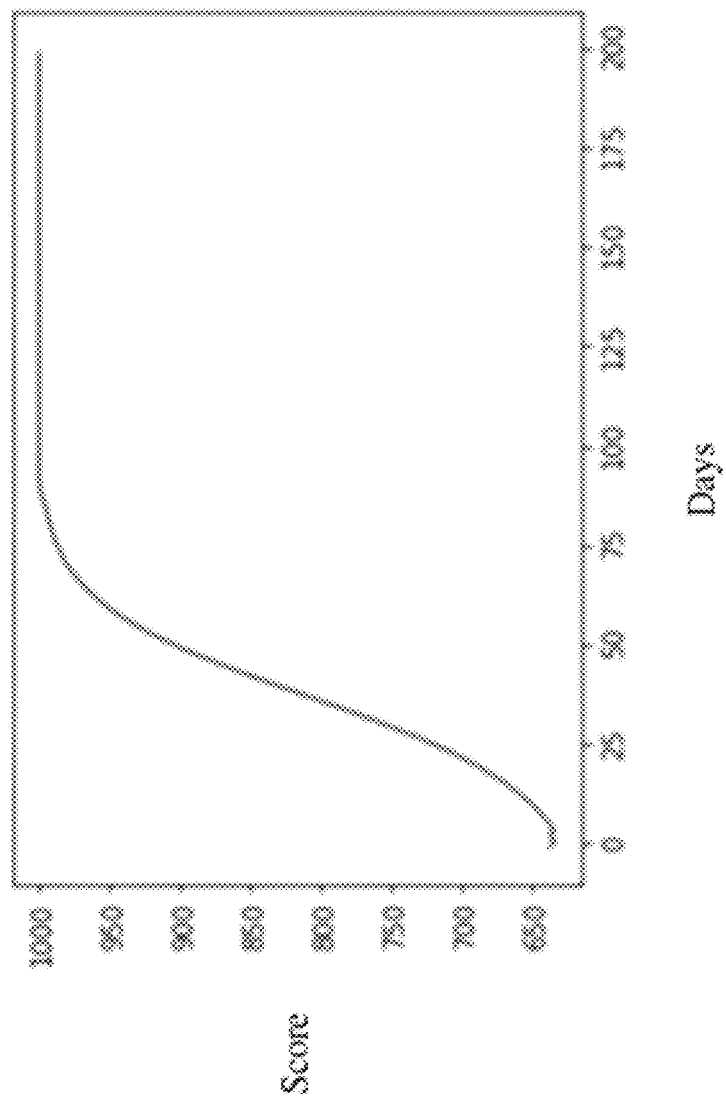
FIG. 7 shows a graph of the User Risk Score for a user over 200 days, where the User Risk Score is the sum of the alerts generated by the user, weighted by the severity and abnormality of the alerts, as well as the time decay factor.

FIG. 7 shows a graph of the User Risk Score for a user over 200 days, where the User Risk Score is the sum of the alerts generated by the user, weighted by the severity and abnormality of the alerts, as well as the time decay factor. Risk score is used for sorting users and assets based on their behavior abnormalities.

Figure 8A:
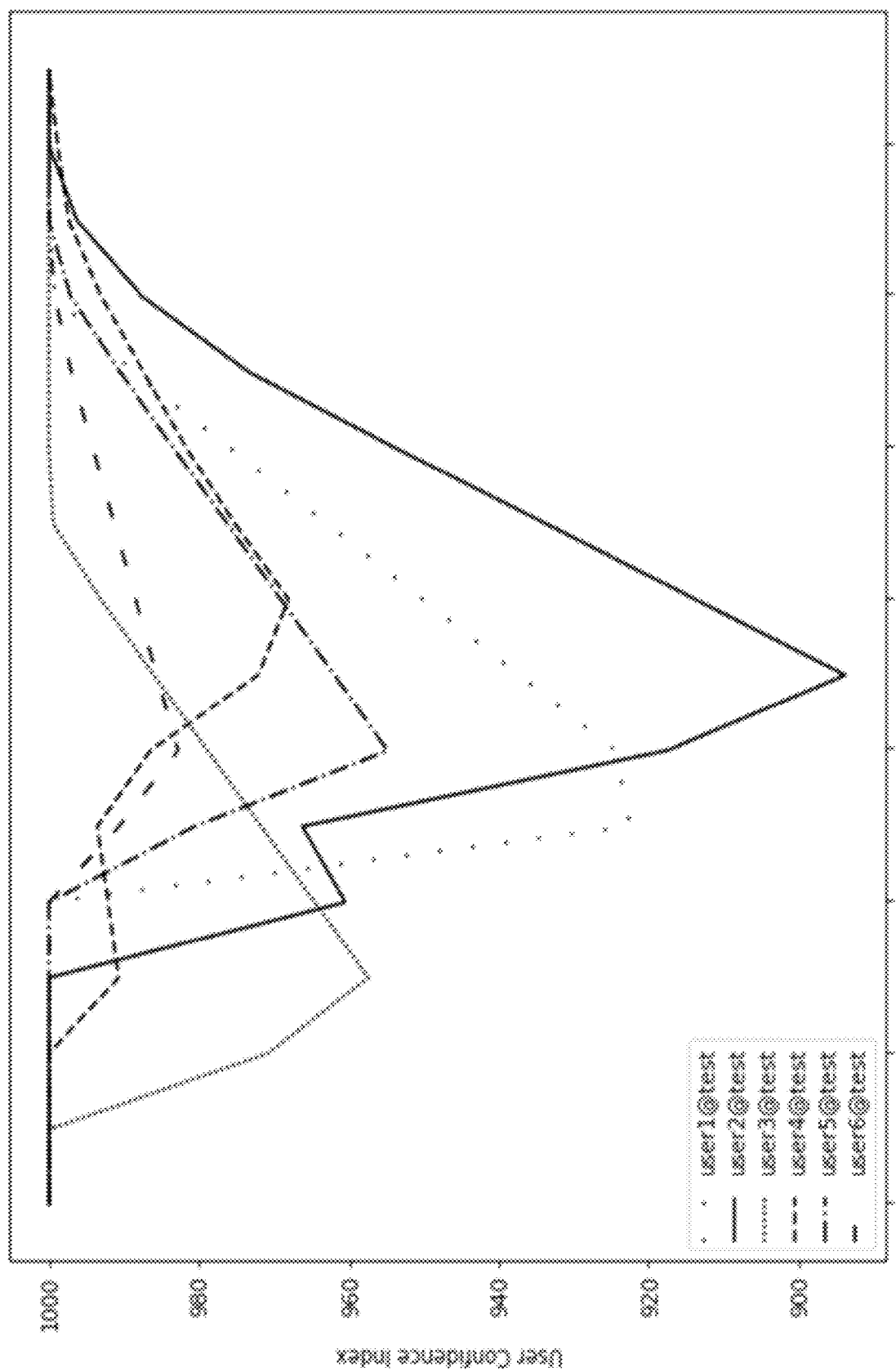
FIG. 8A shows an example plot that demonstrates user confidence scoring for a set of six users
Figure 8B:
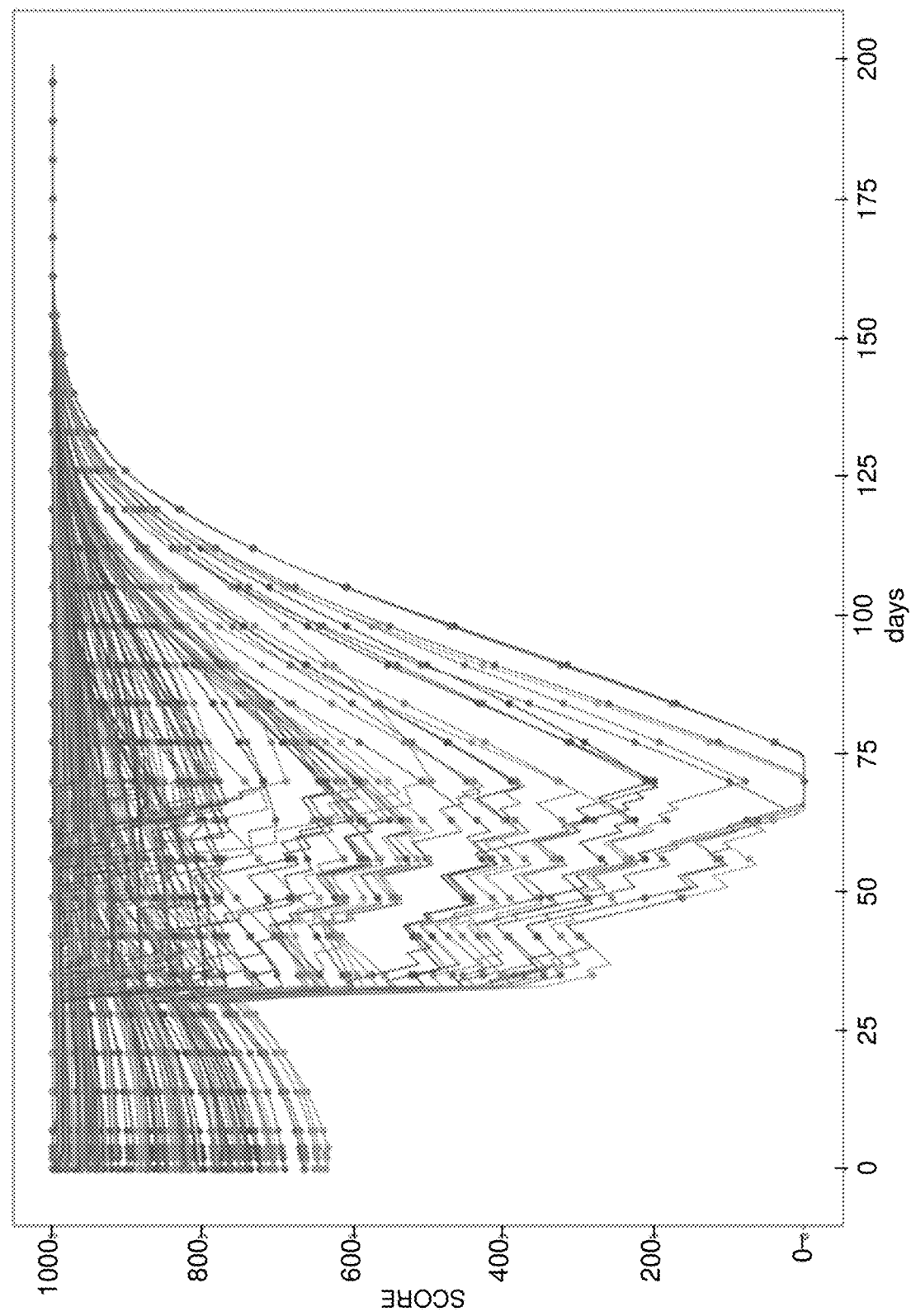
FIG. 8B shows an example plot that demonstrates user confidence scoring for a set of many users in an organization.

FIG. 8A shows an example plot that demonstrates user confidence scoring for a set of six users. Each line is an individual user's user confidence score graphed as a function of time in days. Dots on the graph are triggered by alerts and the score climbs as days pass without alerts for the user, due to the decay weighting over time described above. User confidence scores drop when alerts occur FIG. 8B shows an example plot that demonstrates user confidence scoring for a set of many users in an enterprise. Each line is an individual user's user confidence score graphed as a function of time in days. Dots on the graph are triggered by alerts and the score climbs as days pass, due to the decay weighting over time described above. User confidence scores drop when alerts occur. In this example, the scores in the plot include a time when a customer was the victim of an intrusion attack. During several days, many accounts in the company had massive login failures because the attacker was trying random accounts. Therefore, the graph shows a drop for many users during those days.

Figure 9:
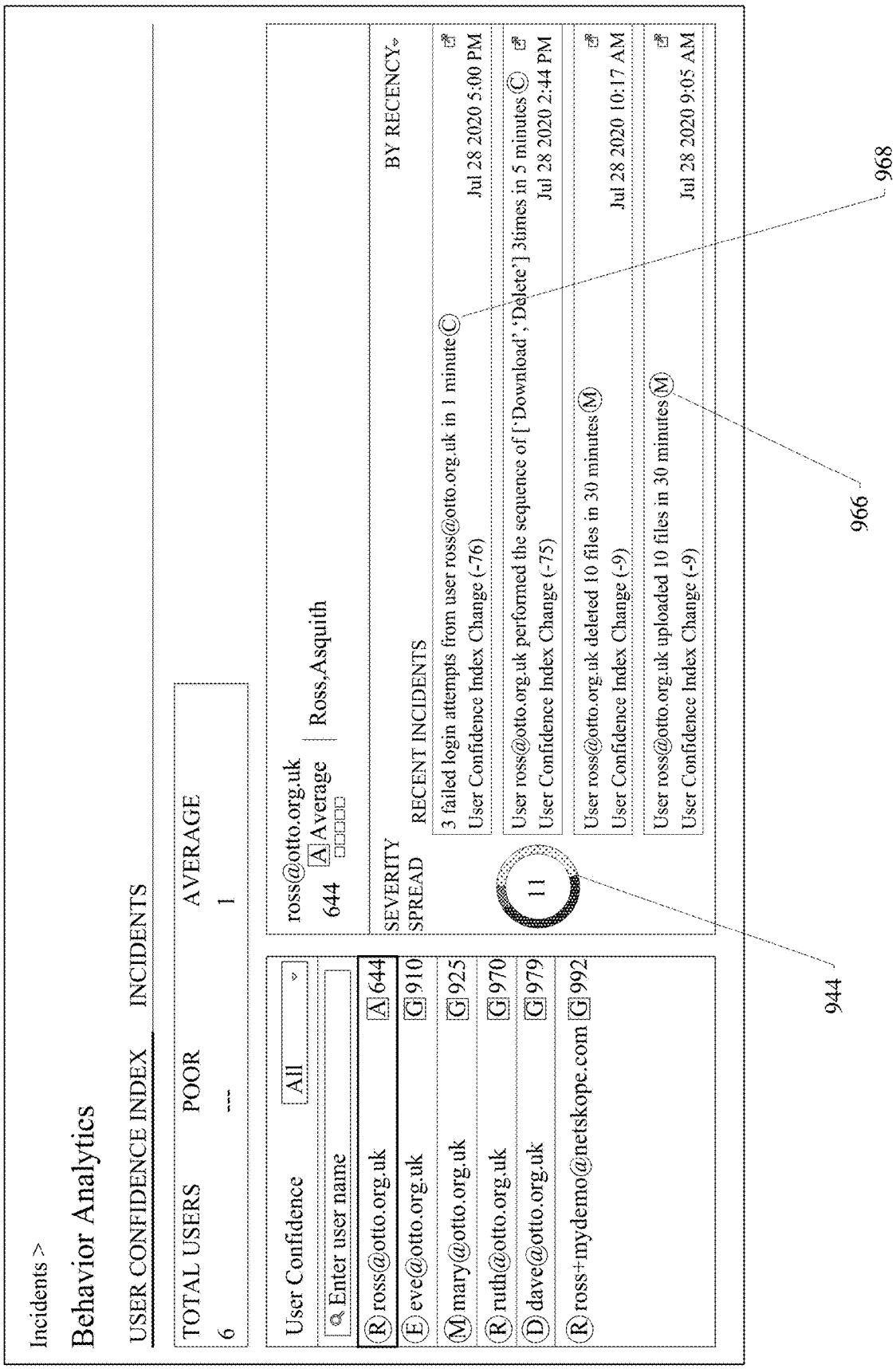
FIG. 9 illustrates a representative user interface for user confidence scores for use by admins.

FIG. 9 illustrates a representative user interface for displaying user confidence scores to admins. The UI for admins shows the user confidence scores of users, with the order ranked by the users' confidence scores, such as those shown in FIG. 5. Details of the activity by the user that contributed to the alert weights over time are listed. The circled C 968 signals Critical, a circled H (not shown in this example) signals High alert severity, and the circled M 966 signals Medium severity. The number eleven 944 is a count of the number of incidents/alerts for this user. The UI lists four of the 11 incidents.

Customer admins viewing the disclosed user confidence score UI can readily notice the users who have exhibited more risky behaviors. In a different UI display using risk scores, the users with lower scores can be listed on the top. Security admin utilize the UI to log in and can view rank order of users within a tenant (enterprise). Low user confidence scores are highlighted, and the administrator can focus on those users. The UI also provides additional evidence and reasons when flagging such behavior, as the admin needs to understand the basis for a decision in order to communicate effectively to the end user or security analysts. For example, a manager may ask why a certain user's behavior has been deemed anomalous.

Adaptive access control with the disclosed user confidence scoring allows security admins to sort users in a company to identify which users are riskier, based on the analysis of their risk scores. For a specific score, actions can be configured by the admin, or actions can be set to automatically occur based on scoring thresholds, such as requiring a user to reset their password, removing access to sensitive files, and blocking access by a user to specific apps, including but not limited to Google drive and Box.

Computer System

Figure 10:
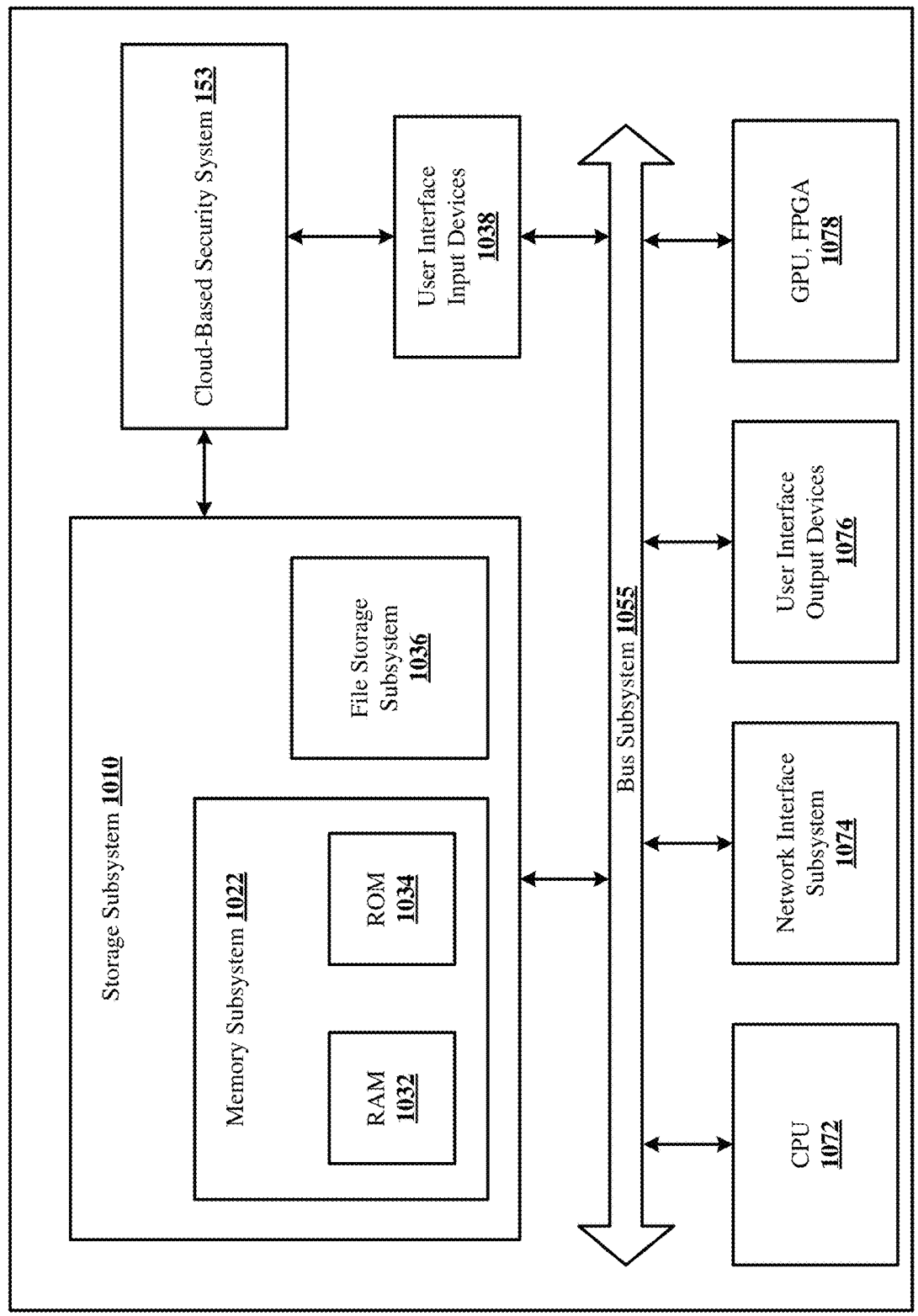
FIG. 10 is a simplified block diagram of a computer system that can be used for evaluating user compliance with an organization's security policies, calibrating a user confidence or risk score that expresses evaluation of user behavior that was not compliant with an organization's security policies, and for reducing false detection of anomalous user behavior on a computer network, win accordance with an implementation of the disclosed technology.

FIG. 10 is a simplified block diagram of a computer system 1000 that can be used for evaluating user compliance with an organization's security policies, calibrating a user confidence or risk score that expresses evaluation of user behavior that was not compliant with an organization's security policies, and for reducing false detection of anomalous user behavior on a computer network. Computer system 1000 includes at least one central processing unit (CPU) 1072 that communicates with a number of peripheral devices via bus subsystem 1055, and cloud-based security system 153 for providing network security services described herein. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, cloud-based security system 153 of FIG. 1 is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.

Particular Implementations

Some particular implementations and features for evaluating user compliance with an organization's security policies are described in the following discussion.

In one disclosed implementation, a method of evaluating user compliance with an organization's security policies includes formulating a user confidence or risk score, comprising scoring for each user a sum of alert weights, categorized by severity, and generated over time. Each contribution to an alert weight is generated due to an activity by the user that the organization's security policies treat as risky, and the alert weights over time are subject to a decay factor that attenuates the alert weights as time passes. The disclosed method also includes reporting the user confidence score, comprising causing display of a time series of the user confidence or risk scores over a predetermined time and/or a current user confidence or risk score and/or at least some details of the activity by the user that contributed to the alert weights over time.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In one implementation, the disclosed method of evaluating user compliance with an organization's security policies includes applying the formulating and reporting to at least 10 users and reporting an ordered list of the current user confidence score for each user, from low to high, or risk score from high to low risk.

Some implementations of the disclosed method further include applying the formulating and reporting to at least 10 users and reporting a graph of the time series for the at least 10 users. In some cases, the disclosed method also includes applying the formulating and reporting to at least 10 users, and selecting the user confidence scores of users whose activity the organization's security policies treat as risky based on one of a predetermined threshold or a configurable percentage of a total possible user confidence score for the user.

In one implementation of the disclosed method, an alert weight is applied to one of a sequence alert and a batch alert wherein a sequence alert is generated for a user upon observation of an activity, by a user, in a set of preconfigured behavior patterns, and a batch alert is generated when an unexpected behavior is detected, compared to historical user behavior patterns of a peer group of users. In some implementations, the decay factor that attenuates the alerts weights is a function of a number of days since the alert occurred. Some implementations of the disclosed method further include reporting recommended actions based on scoring thresholds, with the actions including requiring a user to reset their password, removing user access to sensitive files, and/or blocking access by a user to specific apps, including but not limited to Google drive and Box.

In one disclosed implementation, a method of calibrating a user confidence or risk score that expresses evaluation of user behavior that was not compliant with an organization's security policies includes configuring components of the user confidence or risk score, comprising configuring categorical alert weights, categorized by severity, responsive to administrator controls, for alerts to be generated due to an activity by the user that the organization's security policies treat as risky. The method also includes configuring a decay factor that attenuates the alert weights as time passes, responsive to an administrator sensitivity control, and causing display of resulting user behavior evaluation examples, based on activity examples for user examples, comprising causing display of a time series of the user confidence or risk scores for the activity examples for the user examples and a resulting user confidence or risk score for the user examples.

Some disclosed implementations further include causing display of controls for drill down into one or more activities of an individual example user in the time series, receiving a request to drill down, and causing display of details of activities requested by the drill down, including the example activities requested that appear in the time series.

For some implementations, the categorical alert weights include informational, low, medium, high and critical. For some implementations, the activity examples include failed login attempt, deleting a configurable number files in a predetermined time period, and uploading a configurable number of files in a predetermined time period.

One implementation of the disclosed method also includes displaying the user confidence or risk score as a graph of activity example counts weighted by the categorical alert weights. In one case, the request to drill down is activated by selecting one of a drop down selector and a name field for the individual example user.

Some particular implementations and features for reducing false detection of anomalous user behavior on a computer network are described next.

In one disclosed implementation, a method of reducing false detection of anomalous user behavior on a computer network includes forming groups from identity and access management (IAM) properties and assigning the users into initially assigned groups based on respective IAM properties and recording individual user behavior in a statistical profile, including application usage frequency. The method also includes dynamically assigning an individual user with a realigned group, different from the initial assigned group, based on comparing the recorded individual user behavior, with user behavior in statistical profiles of the users in the groups. The disclosed method further includes evaluating and reporting anomalous events among ongoing behavior of the individual user based on deviations from a statistical profile of the realigned group.

In one implementation of the disclosed method, properties from the IAM used for forming the groups include common app usage, common location and common organization. In some implementations of the disclosed method, the statistical profiles of groups are not used when fewer than 100 users or ten percent of organization population are included in the group, or more than 500 users or eighty percent of the organization population are included in the group.

In one implementation of the disclosed method, three-quarters of the groups formed have 30 to 500 users per group. In some implementations, evaluating anomalous events further includes evaluating deviations of the events among ongoing behavior of the individual user based from their statistical profile. For some implementations the IAM is active directory (AD). In other implementations, the IAM is open lightweight access protocol (LDAP).

Other implementations of the methods described in this section can include a tangible non-transitory computer readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of calibrating an evaluation of user behavior not compliant with an organization's security policies, including the actions of:
   configuring components for determination of a user confidence or a risk score of a user, said user being assigned to a group within an organization,
   said configuring components being enabled via a cloud-based security system, said cloud-based security system being configured to assess a threat of anomalous computer network related behavior of said user towards said organization, said cloud-based security system being implemented as computer readable instructions being stored within a non-transitory computer readable storage medium, said computer readable instructions being executed via at least one central processing unit (CPU),
   said threat being detected via occurrences of one or more alerts, said alert being defined as a sequence of events, said sequence of events including at least one of an occurrence of a deletion of a file, an occurrence of an uploading of a file and an occurrence of a downloading of a file;
   said action of configuring components further comprising actions of:
   configuring categorical alert weights, categorized by severity, responsive to administrator controls, for alerts to be generated due to an activity by the user that the organization's security policies treat as risky; and
   configuring a decay factor that attenuates the alert weights as time passes, responsive to an administrator sensitivity control; and
   causing display of resulting user behavior evaluation examples, based on said activity examples for user examples, causing display of:
      a time series of the user confidence or risk scores for said activity examples for said user examples; and
      a resulting user confidence or risk score for said user examples.

2. The method of claim 1, further including the actions of:
   causing display of controls for drill down into one or more activities of an individual example user in the time series;
   receiving a request to drill down; and
   causing display of details of activities requested by the drill down, including the example activities requested that appear in the time series.

3. The method of claim 1, wherein the categorical alert weights include informational, low, medium, high and critical.

4. The method of claim 1, wherein the activity examples include failed login attempt, deleting a configurable number files in a predetermined time period, and uploading a configurable number of files in a predetermined time period.

5. The method of claim 1, further including the actions of displaying the user confidence or risk score as a graph of activity example counts weighted by the categorical alert weights.

6. The method of claim 2, wherein the request to drill down is activated by selecting one of a drop down selector and a name field for the individual example user.

7. A tangible non-transitory computer readable storage medium, including program instructions loaded into memory that, when executed on processors, cause the processors to implement a method of calibrating an evaluation of user behavior not compliant with an organization's security policies, said method of calibrating including actions of:
   configuring components of a user confidence or a risk score of a user, said user being assigned to a group within an organization, said configuring components being enabled via a cloud-based security system, said cloud-based security system being configured to assess a threat of anomalous computer network related behavior of said user towards said organization, said cloud-based security system being implemented as computer readable instructions being stored within a non-transitory computer readable storage medium, said computer readable instructions being executed via at least one central processing unit (CPU),
   said threat being detected via occurrences of one or more alerts, each of said alerts being sequences of events including at least one of an occurrence of a deletion of a file, an occurrence of an uploading of a file and an occurrence of a downloading of a file;
   said configuring components further comprising actions of:
   configuring categorical alert weights, categorized by severity, responsive to administrator controls, for alerts to be generated due to an activity by the user that the organization's security policies treat as risky; and configuring a decay factor that attenuates the alert weights as time passes, responsive to an administrator sensitivity control; and causing display of resulting user behavior evaluation examples, based on activity examples for user examples, causing display of:

a time series of said user confidence or risk scores for the activity examples for said user examples; and a resulting user confidence or risk score for said user examples.

8. The tangible non-transitory computer readable storage medium of claim 7, further including:

causing display of controls for drill down into one or more activities of an individual example user in the time series;

receiving a request to drill down; and causing display of details of activities requested by the drill down, including the example activities requested that appear in the time series.

9. The tangible non-transitory computer readable storage medium of claim 7, wherein the categorical alert weights include informational, low, medium, high and critical.

10. The tangible non-transitory computer readable storage medium of claim 7, wherein the activity examples include failed login attempt, deleting a configurable number files in a predetermined time period, and uploading a configurable number of files in a predetermined time period.

11. The tangible non-transitory computer readable storage medium of claim 7, further including displaying the user confidence or risk score as a graph of activity example counts weighted by the categorical alert weights.

12. The tangible non-transitory computer readable storage medium of claim 8, wherein the request to drill down is activated by selecting one of a drop down selector and a name field for the individual example user.

13. A device for calibrating an evaluation of user behavior not compliant with an organization's security policies, the device including a processor, memory coupled to the processor, and computer instructions loaded into the memory that, when executed, cause the processor to implement a process that includes the actions of:

configuring components of a user confidence or a risk score of a user, said user being assigned to a group within an organization, said configuring components being enabled via a cloud-based security system, said cloud-based security system being configured to assess a threat of anomalous computer network related behavior of said user towards said organization, said cloud-based security system being implemented as computer readable instructions being stored within a non-transitory computer readable storage medium, said computer readable instructions being executed via at least one central processing unit (CPU), said threat being detected via occurrences of one or more alerts, said alerts being activity examples, said alerts including at least one of an occurrence of a deletion of a file, an occurrence of an uploading of a file and an occurrence of a downloading of a file;

said configuring components further comprising actions of:

configuring categorical alert weights, categorized by severity, responsive to administrator controls, for alerts to be generated due to an activity by said user that the organization's security policies treat as risky; and configuring a decay factor that attenuates the alert weights as time passes, responsive to an administrator sensitivity control; and causing display of resulting user behavior evaluation examples, based on activity examples for user examples, causing display of:

a time series of the user confidence or risk scores for said activity examples for said user examples; and a resulting user confidence or risk score for said user examples.

14. The device of claim 13, further including:

causing display of controls for drill down into one or more activities of an individual example user in the time series;

receiving a request to drill down; and causing display of details of activities requested by the drill down, including the example activities requested that appear in the time series.

15. The device of claim 13, wherein the categorical alert weights include informational, low, medium, high and critical.

16. The device of claim 13, wherein the activity examples include failed login attempt, deleting a configurable number files in a predetermined time period, and uploading a configurable number of files in a predetermined time period.

17. The device of claim 13, further including displaying the user confidence or risk score as a graph of activity example counts weighted by the categorical alert weights.

18. The device of claim 14, wherein the request to drill down is activated by selecting one of a drop down selector and a name field for the individual example user.

19. The method of claim 1 wherein an alert is defined as a sequence of events including at least two of an occurrence of a deletion of a file, an occurrence of an uploading of a file and an occurrence of a downloading of a file.

20. The method of claim 1 wherein an alert is defined as a sequence of events including a pairing of an occurrence of a downloading of a file followed by an occurrence of a deletion of said file in time sequence, and wherein said pairing occurs with respect to other files at least ten times, over a period of time equal to ten minutes.

* * * * *